US008458684B2

(12) United States Patent
Eichenberger et al.

(10) Patent No.: US 8,458,684 B2
(45) Date of Patent: Jun. 4, 2013

(54) INSERTION OF OPERATION-AND-INDICATE INSTRUCTIONS FOR OPTIMIZED SIMD CODE

(75) Inventors: Alexandre E. Eichenberger, Chappaqua, NY (US); Alan Gara, Mount Kisco, NY (US); Michael K. Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 12/543,628

(22) Filed: Aug. 19, 2009

(65) Prior Publication Data

US 2011/0047359 A1 Feb. 24, 2011

(51) Int. Cl.
*G06F 9/45* (2006.01)

(52) U.S. Cl.
USPC ............................ 717/159; 717/154; 717/131

(58) Field of Classification Search
USPC .................................. 717/124–133, 140–161
See application file for complete search history.

(56) References Cited

U.S. PATENT DOCUMENTS

| | | | |
|---|---|---|---|
| 5,386,563 A | 1/1995 | Thomas | |
| 5,430,668 A | 7/1995 | Hagihara | |
| 5,649,136 A | 7/1997 | Shen et al. | |
| 5,655,096 A | 8/1997 | Branigin | |
| 5,673,426 A | 9/1997 | Shen et al. | |
| 5,748,936 A | 5/1998 | Karp et al. | |
| 5,778,219 A | 7/1998 | Amerson et al. | |
| 5,799,179 A | 8/1998 | Ebcioglu et al. | |
| 5,915,117 A | 6/1999 | Ross et al. | |
| 5,966,530 A | 10/1999 | Shen et al. | |
| 6,301,705 B1 | 10/2001 | Doshi et al. | |
| 6,519,694 B2* | 2/2003 | Harris | 712/220 |
| 7,000,226 B2 | 2/2006 | Gao et al. | |
| 7,248,153 B2 | 7/2007 | Danz et al. | |
| 2003/0028759 A1 | 2/2003 | Prabhu et al. | |
| 2004/0025182 A1 | 2/2004 | Tari et al. | |
| 2004/0268309 A1 | 12/2004 | Grover et al. | |
| 2005/0204194 A1 | 9/2005 | Curry | |
| 2006/0227702 A1 | 10/2006 | Ash et al. | |
| 2007/0050603 A1 | 3/2007 | Vorbach et al. | |

(Continued)

OTHER PUBLICATIONS

Intel, "IA-32 Intel® Architecture Software Developer's Manual", 2003, Intel Corporation, vol. 1: Basic Architecture, chapters 1-4, 74 pages.*

(Continued)

*Primary Examiner* — Ted T Vo
(74) *Attorney, Agent, or Firm* — Stephen J. Walder, Jr.; William Stock

(57) ABSTRACT

Mechanisms are provided for inserting indicated instructions for tracking and indicating exceptions in the execution of vectorized code. A portion of first code is received for compilation. The portion of first code is analyzed to identify non-speculative instructions performing designated non-speculative operations in the first code that are candidates for replacement by replacement operation-and-indicate instructions that perform the designated non-speculative operations and further perform an indication operation for indicating any exception conditions corresponding to special exception values present in vector register inputs to the replacement operation-and-indicate instructions. The replacement is performed and second code is generated based on the replacement of the at least one non-speculative instruction. The data processing system executing the compiled code is configured to store special exception values in vector output registers, in response to a speculative instruction generating an exception condition, without initiating exception handling.

19 Claims, 15 Drawing Sheets

U.S. PATENT DOCUMENTS

| | | |
|---|---|---|
| 2008/0034357 A1 | 2/2008 | Gschwind |
| 2008/0189519 A1 | 8/2008 | Gschwind et al. |
| 2008/0215922 A1 | 9/2008 | Cheng et al. |
| 2009/0158012 A1 | 6/2009 | Hansen et al. |

OTHER PUBLICATIONS

Intel, "IA-64 Intel® Architecture Software Developer's Manual", 2000, Intel Corporation, vol. 1: IA-64 Application Architecture, chapters 1-12, 202 pages.*

International Search Report and Written Opinion dated Sep. 15, 2010 for International Application No. PCT/US2010/042377, 8 pages.

USPTO U.S. Appl. No. 12/543,614, 1 page.

U.S. Appl. No. 12/134,495, filed Jun. 6, 2008, Eichenberger, Alexandre E., et al.

U.S. Appl. No. 12/250,575, filed Oct. 14, 2008, Gschwind, Michael K.

U.S. Appl. No. 12/250,581, filed Oct. 14, 2008, Gschwind, Michael K.

U.S. Appl. No. 12/250,584, filed Oct. 14, 2008, Eichenberger, Alexandre E., et al.

U.S. Appl. No. 12/250,599, filed Oct 14, 2008, Eichenberger, Alexandre E., et al.

Asanovic, Krste, "Vector Microprocessors", Disseration, University of California, Berkeley, 1998, http://citeseer.ist.psu.edu/cache/papers/cs/11989/http:zSzzSzwww.icsi.berkeley.eduzSz~krstezSzthesis.pdf, 268 pages.

Buchholz, W., "The IBM System/370 vector architecture", IBM Systems Journal, vol. 25, No. 1, 1986, pp. 51-62.

Gibbs, Ben et al., "IBM eServer BladeCenter JS20 PowerPC 970 Programming Environment", IBM Corporation, Jan. 2005, www.redbooks.ibm.com/redpapers/pdfs/redp3890.pdf, 140 pages.

Gschwind, Michael et al., "Synergistic Processing in Cell's Multicore Architecture", IEEE Micro, vol. 26, No. 2, 2006, pp. 10-24.

Salapura, Valentina et al., "Exploiting Workload Parallelism for Performance and Power Optimization in Blue Gene", IEEE, 2006, pp. 67-81.

Eichenberger, Alexandre E. et al., "In-Data Path Tracking of Floating Point Exceptions and Store-Based Exception Indication", U.S. Appl. No. 12/543,614, filed Aug. 19, 2009.

Final Office Action mailed Oct. 25, 2012 for U.S. Appl. No. 12/543,614, 38 pages.

Response to Office Action filed with the USPTO on Oct. 1, 2012 for U.S. Appl. No. 12/543,614, 16 pages.

Office Action mailed Jun. 29, 2012 for U.S. Appl. No. 12/543,614, 35 pages.

"Intel (Itanium Architecture Software Developer's Manual)", vol. 1: Application Architecture—Revision 2.1, Oct. 2002, part 1, 112 pages.

"Intel (Itanium Architecture Software Developer's Manual)", vol. 1: Application Architecture—Revision 2.1, Oct. 2002, part 2, 114 pages.

Interview Summary dated Jan. 28, 2013 for U.S. Appl. No. 12/543,614; 3 pages.

Response to Final Office Action filed with the USPTO on Jan. 24, 2013 for U.S. Appl. No. 12/543,614; 22 pages.

* cited by examiner

**Quadvector Store Floating-Point Single
Indexed and Indicate**                             X-form qvstfsxi     QRS,RA,RB                             (X=0)
qvstfsxia    QRS,RA,RB                             (X=1)

| 31 | QRS | RA | RB | 645 | X |
|----|-----|----|----|-----|---|
| 0  | 6   | 11 | 16 | 21  | 31 | if QPU_enable_indicate_NaN)
    if isNaN (QRS $^{0:7}$) OR
      isNaN (QRS $^{8:15}$) OR
      isNaN (QRS $^{16:23}$) OR
      isNaN (QRS $^{24:31}$)
      indicate QPU exception if QPU_enable_indicate_Infinity)
    if isInf (QRS $^{0:7}$) OR
      isInf (QRS $^{8:15}$) OR
      isInf (QRS $^{16:23}$) OR
      isInf (QRS $^{24:31}$)
      indicate QPU exception if RA - 0 then    b ← 0
else              b ← (RA)
EA ← MEM16(b+ (RB))
MEM(EA, 16) ← SINGLEVEC ((QRS))

Let the effective address (EA) be the sum (RA[0]+(RB)).

The contents of register QRS are converted to single format (see page 34) and stored into the 16 bytes in storage addressed by the 16-byte aligned EA.

If the X bit is set, and the address is not aligned on a 16 byte boundary, an exception is raised.

Special Registers Altered:
    None

INSERTION OF OPERATION-AND-INDICATE INSTRUCTIONS FOR OPTIMIZED SIMD CODE

This invention was made with United States Government support under Contract No. B554331 awarded by the Department of Energy. THE GOVERNMENT HAS CERTAIN RIGHTS IN THIS INVENTION.

BACKGROUND

The present application relates generally to an improved data processing apparatus and method and more specifically to mechanisms for insertion of operation-and-indicate instructions for optimized Single Instruction Multiple Data (SIMD) code.

Multimedia extensions (MMEs) have become one of the most popular additions to general-purpose microprocessors. Existing multimedia extensions can be characterized as Single Instruction Multiple Data (SIMD) path units that support packed fixed-length vectors. The traditional programming model for multimedia extensions has been explicit vector programming using either (in-line) assembly or intrinsic functions embedded in a high-level programming language. Explicit vector programming is time-consuming and error-prone. A promising alternative is to exploit vectorization technology to automatically generate SIMD codes from programs written in standard high-level languages.

Although vectorization has been studied extensively for traditional vector processors decades ago, vectorization for SIMD architectures has raised new issues due to several fundamental differences between the two architectures. To distinguish between the two types of vectorization, the latter is referred to as SIMD vectorization, or SIMDization. One such fundamental difference comes from the memory unit. The memory unit of a typical SIMD processor bears more resemblance to that of a wide scalar processor than to that of a traditional vector processor. In the VMX instruction set found on certain PowerPC microprocessors (produced by International Business Machines Corporation of Armonk, N.Y.), for example, a load instruction loads 16-byte contiguous memory from 16-byte aligned memory, ignoring the last 4 bits of the memory address in the instruction. The same applies to store instructions.

There has been a recent spike of interest in compiler techniques to automatically extract SIMD parallelism from programs. This upsurge has been driven by the increasing prevalence of SIMD architectures in multimedia processors and high-performance computing. These processors have multiple function units, e.g., floating point units, fixed point units, integer units, etc., which can execute more than one instruction in the same machine cycle to enhance the uni-processor performance. The function units in these processors are typically pipelined.

In performing compiler based transformations of loops to extract SIMD parallelism, it is important to ensure array reference safety. That is, during compilation of source code for execution by a SIMD architecture, the compiler may perform various optimizations including determining portions of code that may be parallelized for execution by the SIMD architecture. This parallelization typically involves vectorizing, or SIMD vectorizing, or SIMDizing, the portion of code. One such optimization involves the conversion of branches in code to predicated operations in order to avoid the branch misprediction penalties encountered by pipelined function units. This optimization involves converting conditional branches in source code to predicated code with predicate operations using comparison instructions to set up Boolean predicates corresponding to the branch conditions. Thus, the predicates, which now guard the instructions, either execute or nullify the instruction according to the predicate's value, a process called commonly referred to as "if-conversion."

In short, predicated code generated by traditional if-conversion generates straight-line code by executing instructions from two mutually exclusive execution paths, suppressing instructions corresponding to one of the two mutually exclusive paths. It is quite common for one of these mutually exclusive execution paths to generate a variety of undesirable erroneous execution effects and, in particular, illegal memory references, when this path does not correspond to the chosen path. Accordingly, "if-conversion" might result in erroneous executions if it were not for the nullification of non-selected predicated instructions in accordance with "if-conversion", and in particular for memory reference instructions in if-converted code.

Gschwind et al., "Synergistic Processing in Cell's Multi-core Architecture", IEEE Micro, March 2006 introduces the concept of data-parallel if-conversion which is being increasingly widely adopted for compilation for data-parallel SIMD architectures. Unlike traditional scalar if-conversion, data-parallel if-conversion typically targets code generation with data-parallel select as supported by many SIMD architectures, as described in co-pending and commonly assigned U.S. Patent Application Publication No. US20080034357A1, filed Aug. 4, 2006, entitled "Method and Apparatus for Generating Data Parallel Select Operations in a Pervasively Data Parallel System" to Gschwind et al., because data-parallel SIMD architectures typically do not offer predicated execution.

Thus, traditional if-conversion guards each instruction with a predicate indicating the execution or non-execution of each instruction corresponding to one or another of mutually exclusive paths. The data-parallel if-conversion with data-parallel select described in the Gschwind et al. patent application publication executes instructions from both paths without a predicate and uses data-parallel select instructions to select a result corresponding to an unconditionally executed path in the compiled code exactly when it corresponds to a taken path in the original source code. Thus, while data-parallel select can be used to implement result selection based on taken-path information, data-parallel if-conversion with data-parallel select is not adapted to nullify instructions. This is because a vector instruction may have one part of its result vector selected when another part of its result vector is not selected, making traditional instruction predication impractical.

The differences between traditional if-conversion and data parallel if-conversion using data-parallel select operations may be more easily understood with regard to the following example code, provided in QPX Assembly language:

a[i]=b[i]/=0? 1/b[i]: DEFAULT;

Traditional if conversion would implement this code in a form as follows:

```
; init FRZEROS = register initialized with 0.0
; init FRDEFAULT = register preloaded with the fault of DEFAULT
LFD                    FBI = b[i]
FCMPEQ                 predicate, FRZERO, FBI
FRE<NOT predicate>     FAI, FBI          <===== conditionally
                                                executed
if predicate indicates that b[i] /= 0, and suppress result and
```

-continued

```
exceptions if b[i]==0
FMR<predicate>   FAI, FRDEFAULT   <===== conditionally
                                        executed
  if predicate indicates that b[i]==0, and suppress move if b[i] /=0
QVSTFD           a[i] = FAI
```

As can be seen, if the predicate condition indicates that the instructions should not be executed, then the result and all associated side effects, such as exceptions, are suppressed. FRE will either generate a single result, in which case it is written and an exception is raised if appropriate, or does not write a single result, in which case the result is not written and no exception is raised.

Consider now the code generated by SIMD vectorization and data-parallel if conversion by exploiting data parallel select, e.g., on an exemplary 4 element vector:

```
; init QRZEROS = vector with 0.0 elements
; init QRDEFAULTS = vector with DEFAULT elements
QVLFD    QBI = b[i:i+3]
QVFRE    QTRE, QBI           <===== may raise spurious divide by
zero if vector instructions are allowed to raise exceptions
QVFCMP   QTC, QRZEROS, QBI
QVFSEL   AQI, QTRE, QRDEFAULTS, QTC
QVSTFD   a[i:i+3] = QAI
```

In accordance with this example, the QVFRE instruction is not predicated and always writes a result. As noted above, the FRE instruction will either write its result, because it generates a single result in which case it is written and an exception is raised if appropriate, or it does not write a single result, in which case the result is not written and no exception is raised. Unlike the FRE instruction, the QVFRE instruction may generate 0, 1, 2, 3, or 4 results to be written back to the vector a[i:i+3]. However, the knowledge on whether a result will be used is not available to the QVFRE instruction and so, it cannot generate the right set of exceptions.

Thus, with data parallel if-conversion being used by compilers to generate SIMDized code for execution in a SIMD processor architecture, exceptions are suppressed to avoid spurious errors. However, it is important to be able to preserve application behavior, even exception generation.

SUMMARY

In one illustrative embodiment, a method, in a data processing system, is provided for inserting indicated instructions for tracking and indicating exceptions in the execution of vectorized code. The method comprises receiving, in a compiler executing on a processor of the data processing system, a portion of first code. The method further comprises analyzing, by the compiler executing on the processor, the portion of first code to identify at least one non-speculative instruction performing a designated non-speculative operation in the first code that is a candidate for replacement by a replacement operation-and-indicate instruction that performs the designated non-speculative operation and further performs an indication operation for indicating any exception conditions corresponding to special exception values present in vector register inputs to the replacement operation-and-indicate instruction. The method also comprises replacing, by the compiler executing on the processor, the at least one non-speculative instruction performing a designated non-speculative operation in the first code with the replacement operation-and-indicate instruction. Moreover, the method comprises generating, by the compiler executing on the processor, second code based on the replacement of the at least one non-speculative instruction. The data processing system is configured to store the special exception values in vector output registers, in response to a speculative instruction generating an exception condition, without initiating exception handling.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a vector register file coupled to the one or more processors. The one or more processors are configured to cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 is an example diagram illustrating a store-and-indicate instruction in accordance with one illustrative embodiment;

FIG. 7B is an example diagram illustrating a set of conditions for which a test for overflow on an operand register may be performed to detect an overflow-to-NaN change condition in accordance with one illustrative embodiment;

DETAILED DESCRIPTION

Figure 1:
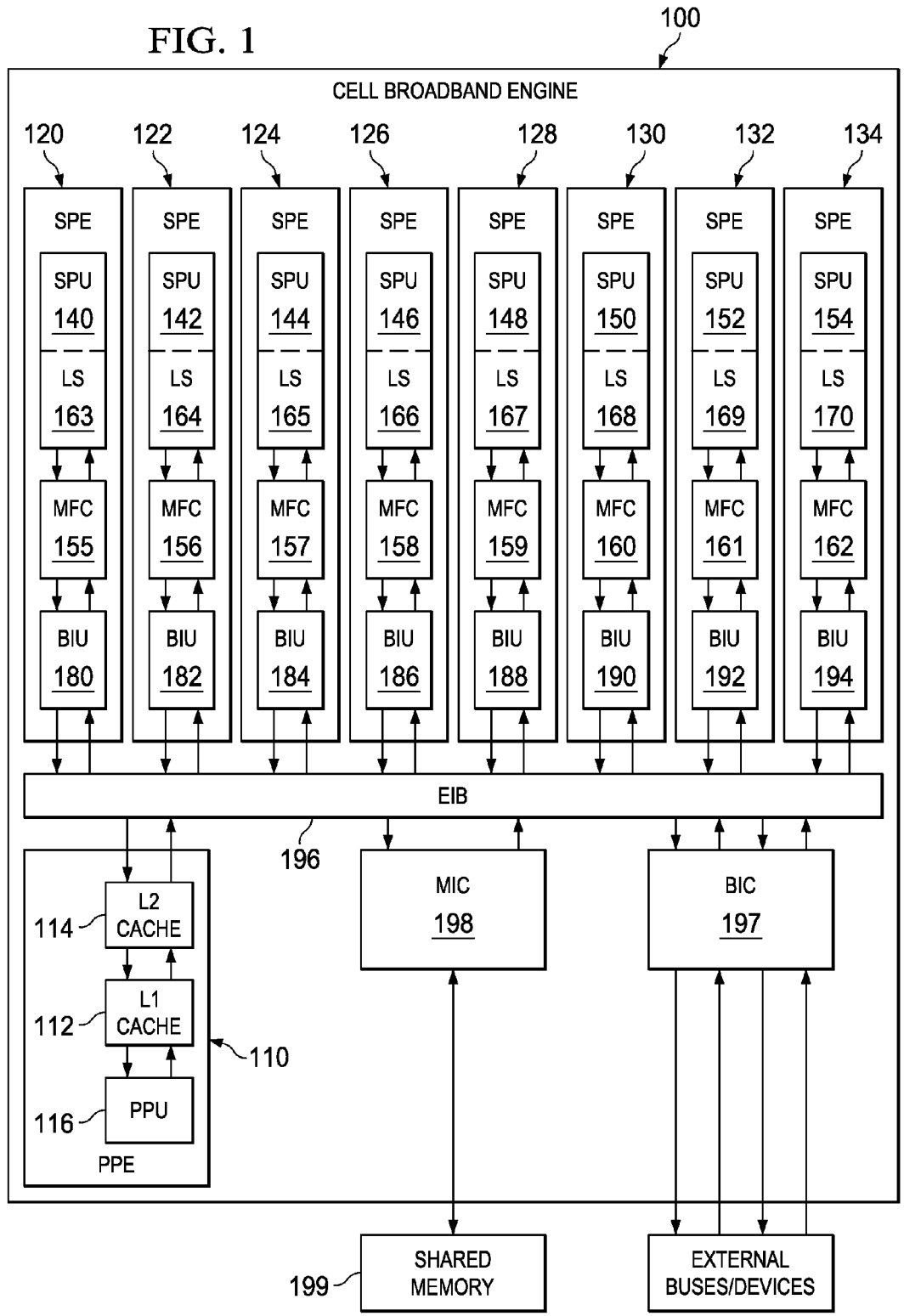
FIG. 1 is an example block diagram of a heterogeneous multiprocessor system on a chip in which exemplary aspects of the illustrative embodiments may be implemented.

The illustrative embodiments provide mechanisms for in-data path tracking of floating point exceptions and store-based exception indication. With the mechanisms of the illustrative embodiments, special values are stored in vector elements when exception conditions are encountered, such as during speculative execution of an instruction or the like. Speculative execution of instructions as part of execution threads is an optimization technique by which early execution of a thread, whose results may or may not be later needed, is performed so as to achieve greater performance should that thread's results be needed during the execution of the code, i.e. should the thread be transitioned from a speculative state to a non-speculative state in which the results are used. The special values of the illustrative embodiments indicate the exception condition but do not invoke the corresponding exception handler. These special values are propagated through the execution of the computer program and through processor architecture with the vector until the vector is to be persisted to memory, such as via a non-speculative instruction, e.g., a store operation, or a move operation for moving data in the vector from the vector register to another vector register. When such a non-speculative instruction is executed, the actual exception is generated and appropriate exception handling is performed. In this way, exception condition detection and exception handling are decoupled from one another such that an exception condition may be detected at one point in the execution pipeline and only triggers an exception to be handled when the exception condition actually affects the execution of the computer program, such as by a speculative instruction's, or set of instructions', execution becoming non-speculative.

The mechanisms of the illustrative embodiments are preferably implemented in conjunction with a compiler that transforms source code into code for execution on one or more processors capable of performing vectorized instructions, e.g., single instruction, multiple data (SIMD) instructions. With the mechanisms of the illustrative embodiments, in transforming the source code, e.g., scalar code, into SIMD vectorized code, operation-and-indicate instructions, such as a move-and-indicate, store-and-indicate, or the like, (collectively referred to as "indicate" instructions) are inserted into the code at appropriate locations to take advantage of the use of the special values identifying the occurrence of an exception condition. The compiler determines the appropriate insertion point according to one or more methodologies based on whether a value of interest is checkable or not checkable, as defined hereafter. In one methodology, portions of SIMD code that are not checkable may be transformed into checkable SIMD code through the use of masking mechanisms. In one methodology, the indicate instructions may be inserted after every computation involving a value of interest, e.g., an array of values of interest. In another methodology, a minimum number of check instructions is inserted at appropriate locations so as to test each live output value, where a value is live if it eventually impacts the storage image or decision process of the code (or a successive computation will use the result to eventually impact the storage image or decision process of the code).

One example of a data processing system in which SIMD capable processors are provided is the Cell Broadband Engine (CBE) available from International Business Machines Corporation of Armonk, N.Y. While the following description will assume a CBE architecture is used to implement the mechanisms of the illustrative embodiments, it should be appreciated that the present invention is not limited to use with the CBE architecture. To the contrary, the mechanisms of the illustrative embodiments may be used with any architecture in which array reference safety analysis may be used with transformations performed by a compiler. The CBE architecture is provided hereafter as only one example of one type of data processing system in which the mechanisms of the illustrative embodiments may be utilized and is not intended to state or imply any limitation with regard to the mechanisms of the illustrative embodiments.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is an exemplary block diagram of a data processing system in which aspects of the present invention may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read/write from/to the local store 163-170 as long as the local store is not placed in a secure mode of operation, in which case only its associated SPU may access the local store 163-170 or a designated secured portion of the local store 163-170.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU executes vector instructions. In another aspect of the CBE architecture, the PPU supports the Power Instruction Set Architecture (ISA) data-parallel SIMD extensions, The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

With the data processing system 100 of FIG. 1, the processor 106 may have facilities for processing both integer (scalar) and floating point (vector) instructions and operating on both types of data. However, in accordance with the illustrative embodiments, the processor 106 may have hardware facilities for handling SIMD instructions and data as floating point only SIMD instructions and data. The scalar facilities are used for integer processing, and in conjunction with the floating point only SIMD architecture for inter alia loop control and memory access control.

Figure 2:
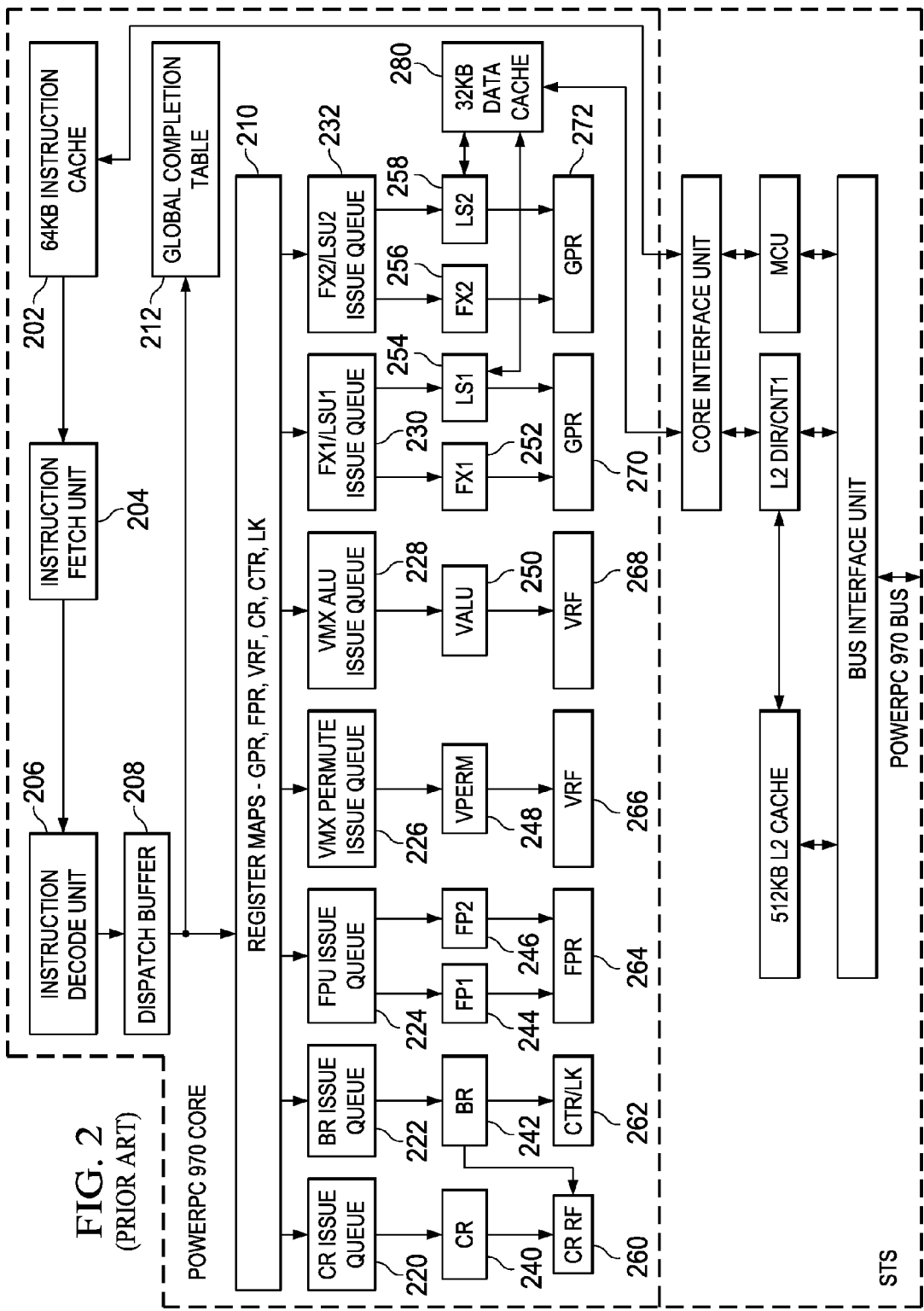
FIG. 2 is a block diagram of a known processor architecture shown for purposes of discussion of the improvements made by some illustrative embodiments.

FIG. 2 is a block diagram of a processor architecture shown for purposes of discussion of the improvements made by the illustrative embodiments. The particular processor architecture shown in FIG. 2 is for the PowerPC™ 970 microprocessors available from International Business Machines Corporation of Armonk, N.Y. and described in the Redbook by Gibbs et al. entitled "IBM eServer BladeCenter JS20 PowerPC 970 Programming Environment," January 2005 (available at www.redbooks.ibm.com/redpapers/pdfs/redp3890.pdf).

As shown in FIG. 2, the processor architecture includes an instruction cache 202, an instruction fetch unit 204, an instruction decode unit 206, and a dispatch buffer 208. Instructions are fetched by the instruction fetch unit 204 from the instruction cache 202 and provided to the instruction decode unit 206. The instruction decode unit 206 decodes the instruction and provides the decoded instruction to the dispatch buffer 208. The output of the decode unit 206 is provided to both the register maps 210 and the global completion table 212. The register maps 210 map to one or more of the general purpose registers (GPRs), floating point registers (FPRs), vector register files (VRF), and the like. The instructions are then provided to an appropriate one of the issues queues 220-232 depending upon the instruction type as determined through the decoding and mapping of the instruction decode unit 206 and register maps 210. The issue queues 220-232 provide inputs to various ones of execution units 240-258. The outputs of the execution units 240-258 go to various ones of the register files 260-272. Data for use with the instructions may be obtained via the data cache 280.

Of particular note, it can be seen in the depicted architecture that there are separate issue queues and execution units for floating point, vector, and fixed point, or integer, instructions in the processor. As shown, there is a single floating point unit (FPU) issue queue 224 that has two output ports to two floating point execution units 244-246 which in turn have output ports to a floating point register file 264. A single vector permute issue queue 226 has a single output port to a vector permute execution unit 248 which in turn has a port for accessing a vector register file (VRF) 266. The vector arithmetic logic unit (ALU) issue queue 228 has one issue port for issuing instructions to the vector ALU 250 which has a port for accessing the vector register file 268. It should be appreciated that these issue queues, execution units, and register files all take up resources, area, and power.

Figure 3:
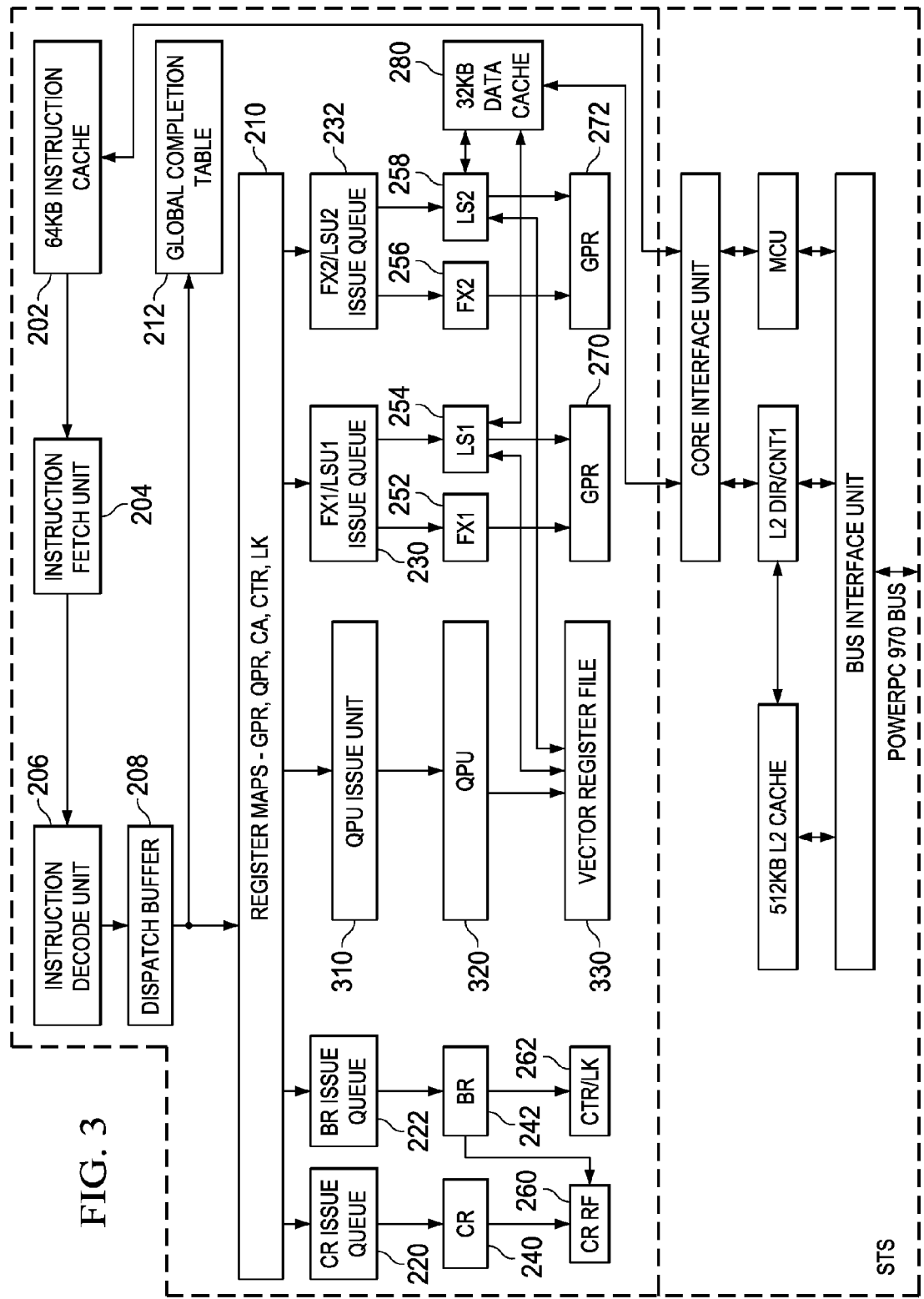
FIG. 3 is an exemplary diagram of a modified form of the processor architecture shown in FIG. 2 in which exemplary aspects of the illustrative embodiments may be implemented.

With some illustrative embodiments, in providing mechanisms for a floating-point only SIMD architecture, these issue units 224-228, the execution units 244-250, and register files 264-268 are replaced with a single issue queue, execution unit, and register file. FIG. 3 is an exemplary diagram showing the alternative processor architecture in accordance with some illustrative embodiment. The processor architecture shown in FIG. 3 is of a modified form of the PowerPC™ 970 architecture shown in FIG. 2 and thus, similar elements to that of FIG. 2 are shown with similar reference numbers. It should be appreciated that the example modified architecture is only an example and similar modifications can be made to other processor architectures to reduce the number of issue units, execution units, and register files implemented in these other architectures. Thus, the mechanisms of the illustrative embodiments are not limited to implementation in a modified form of the PowerPC™ 970 architecture.

As shown in FIG. 3, the modified architecture shown in FIG. 3 replaces the issue units 224-228 with a single quad-processing execution unit (QPU) issue unit 310. Moreover, the execution units 244-250 are replaced with the single quad-processing execution unit (QPU) 320. Furthermore, the register files 264-268 are replaced with a single quad-vector register file (QRF) 330. Because the quad-processing unit (QPU) can execute up to 4 data elements concurrently with a single instruction, this modified architecture not only reduces the resource usage, area usage, and power usage, while simplifying the design of the processor, but the modified architecture also increases performance of the processor.

It should be noted that the modified processor architecture in FIG. 3 still has the fixed point units (FXUs) which process scalar integers. Such scalar integers are used primarily for control operations, such as loop iterations, and the like. All other instructions are of the floating-point or vector format. Specifically, unlike the mixed floating point and integer execution repertoire of the VMX instruction set, the QPX instructions generally operate, and in particular perform arithmetic operations, on floating point data only. The only storage of integer-typed data is associated with conversion of data to an integer format for the purpose of loading and storing such integers, or moving a control word to and from the floating point status and control register (FPSCR). Reducing operations to a floating point-only format greatly enhances efficiency of floating point processing, as an appropriate internal representation optimized for the representation and processing of floating numbers can be chosen without regard to the needs of integer arithmetic, logical operations, and other such operations.

In accordance with one illustrative embodiment, with the floating-point only SIMD ISA, there is no requirement to support integer encoding for the storage of comparison results, Boolean operations, selection operations, and data alignment as is required in prior known ISAs. The floating-point (FP) only SIMD ISA allows substantially all of the data to be stored as floating point data. Thus, there is only one type of data stored in the vector register file 330 in FIG. 3.

In accordance with an illustrative embodiment, the FP only SIMD ISA provides the capability to compare floating point vectors and store comparison results in a floating point vector register of the vector register file 330. Moreover, the FP only SIMD ISA provides an encoding scheme for selection operations and Boolean operations that allows the selection operations and Boolean logic operations to be performed using floating point data representations.

In one illustrative embodiment, the FP only SIMD ISA uses an FP only double precision SIMD vector with four elements, i.e., a quad-vector for quad-execution by the QPU 320. Single precision SIMD vectors are converted automatically to and from double precision during load and store operations. While a double precision vector SIMD implementation will be described herein, the illustrative embodiments are not limited to such and other precisions including, but not limited to, single precision, extended precision, triple precision, and even decimal floating point only SIMD, may be utilized without departing from the spirit and scope of the illustrative embodiments.

In one illustrative embodiment, the mechanisms of the illustrative embodiment for implementing the FP only SIMD ISA are provided primarily as logic elements in the QPU 320. Additional logic may be provided in one or more of the memory units LS1 and LS2 as appropriate. In other illustrative embodiments, the mechanisms of the illustrative embodiments may be implemented as logic in other elements of the modified architecture shown in FIG. 3, such as distributed amongst a plurality of the elements shown in FIG. 3, or in one or more dedicated logic elements coupled to one or more elements shown in FIG. 3. In order to provide one example of the implementation of the illustrative embodiments, it will be assumed for purposes of this description that the mechanisms of the illustrative embodiments are implemented as logic in the QPU 320 unless otherwise indicated. For a more detailed explanation of one illustrative embodiment of the logic in the QPU 320, reference should be made to Appendix A which provides a specification for the QPU 320 architecture.

As part of the FP only SIMD ISA of the illustrative embodiments, capability is provided to compare FP vectors and store comparison results in the FP vector register file 330. Comparison choices are encoded using FP values corresponding to Boolean values. For example, in one illustrative embodiment, for a "TRUE" output, i.e., the conditions of the comparison are met and a "TRUE" result is generated, the output is represented as an FP value of 1.0. For a "FALSE" output, i.e. the conditions of the comparison are not met and a "FALSE" output is generated, the output is represented as an FP value of −1.0. Functions that generate such FP values based on whether or not conditions of a comparison are met or not include the QVFCMPEQ function which compares two FP values to determine if they are equal, the QVFCMPGT function which compares two FP values to determine if a first FP value is greater than a second FP value, and the QVFCMPLT function which compares two FP values to determine if the first FP value is less than the second FP value. In addition, a test function, i.e. QVTSTNAN, is provided for testing for a "Not a Number" (NaN) condition. The output of these functions is either 1.0 for TRUE or −1.0 for FALSE.

In addition to these comparison functions, a matching select functionality is provided in the FP only SIMD ISA of the illustrative embodiments. This quad-vector floating point select, or QVFSEL, function has the format qvfsel QRT, QRA, QRC, QRB. With this quad-vector floating point select function, the floating-point operand in each doubleword slot of register QRA is compared to the value zero to determine a value of TRUE or FALSE. If the operand is greater than or equal to zero (i.e., is TRUE), the corresponding slot of register QRT is set to the contents of register QRC. If the operand is less than zero or is a NaN, register QRT is set to the contents of register QRB. The comparison ignores the sign of zero, i.e., it regards +0.0 as equal to −0.0. Thus, any positive comparison result of this matching select function causes the floating point SIMD vector element of the QRT register to take the corresponding floating point SIMD vector element of the QRC register. Otherwise, any negative or Nan value will cause the floating point SIMD vector element of the QRT register to take the values of the corresponding floating point SIMD vector element in the QRB register.

In accordance with one illustrative embodiment, distinct definitions of TRUE and FALSE are used as input and output representations, wherein the output representation (i.e., the value generated to represent TRUE or FALSE as the result of a computation) are a subset of the range of TRUE and FALSE values used as the input representation. Specifically, the representations shown in Table 1 are used:

TABLE 1

| Input/Output Representations | | |
|---|---|---|
| | TRUE | FALSE |
| Output representation | +1.0 | −1.0 |
| Input representation | ≧±0.0 | <±0.0 or NaN |

In accordance with one aspect of one illustrative embodiment, this choice of input/output representations eliminates undefined behavior. In accordance with another aspect of one illustrative embodiment, this choice also offers compatibility of a "select" function with a legacy "select" function based on floating point sign in accordance with at least one legacy instruction set that does not offer the capability to store Boolean values encoded as floating point numbers and perform comparisons and Boolean operations. In accordance with yet another aspect of one illustrative embodiment, this choice simplifies decoding of Boolean values when used as input to instructions reading Boolean input operands.

Moreover, with the FP only SIMD ISA of the illustrative embodiments, quad-vector floating point logical functions are also defined such that vector outputs are generated. For example, logical functions for AND, OR, XOR, NAND, etc. operations are defined in terms of FP only SIMD ISA Boolean values, e.g., 1.0 for TRUE and −1.0 for FALSE. For example, an AND operation is defined by the FP only SIMD ISA such that 1.0 AND 1.0 results in an output of 1.0, otherwise the output of AND with at least one negative operand is −1.0.

Generally, the operation of an exemplary FP Boolean AND for each vector position of the SIMD vector in accordance with one embodiment of the present invention can be described as per Table 2.

TABLE 2

Exemplary embodiment for FP Boolean AND function

| input1 | input 2 | |
| --- | --- | --- |
| | ≧±0.0 | <±0.0 or NaN |
| ≧±0.0 | +1.0 | −1.0 |
| <±0.0 or NaN | −1.0 | −1.0 |

Similarly, for an OR operation, the FP only SIMD ISA defines 1.0 OR 1.0, −1.0 OR 1.0 and 1.0 OR −1.0 such that it results in an output of 1.0, and −1.0 OR −1.0 giving an output of −1.0.

Generally, the operation of an exemplary FP Boolean OR for each vector position of the SIMD vector in accordance with one embodiment of the present invention can be described as per table 3.

TABLE 3

Exemplary embodiment of FP Boolean OR function

| input1 | input 2 | |
| --- | --- | --- |
| | ≧±0.0 | <±0.0 or NaN |
| ≧±0.0 | +1.0 | +1.0 |
| <±0.0 or NaN | +1.0 | −1.0 |

Those skilled in the art will similarly be able to define other Boolean functions based on a defined set of input and output representations of the values of TRUE and FALSE in accordance with the teachings contained hereinabove and in the scope of the present invention.

In accordance with one exemplary embodiment of this invention, a "flogical" instruction is provided. The "flogical" instruction encodes a "truth table" using 4 bits (i.e., an encoding of an arbitrary Boolean logic function with up to 2 inputs), whereby two Boolean operands, encoded as floating point values, are used to index into this table and obtain a Boolean result. The Boolean result is then encoded as an floating point (FP) Boolean value in accordance with the mechanisms of the illustrative embodiments and stored in the register file. In the context of a SIMD vector architecture, the "flogical" instruction is a vector "qvflogical" instruction. In such a case, the Boolean values in each slot are independently used to independently derive an output result, encoded as FP Boolean, for each vector position.

Further details of an FP-only SIMD ISA that may be used with the SIMD architecture described above in FIG. 3 is provided in commonly assigned and co-pending U.S. patent application Ser. No. 12/250,575, entitled "Floating Point Only Single Instruction Multiple Data Instruction Set Architecture," filed Oct. 14, 2008, which is hereby incorporated by reference.

Referring again to FIG. 1, the SPEs 120-134 and/or PPE 110 of the CBE 100 may make use of a FP only SIMD architecture as shown in FIG. 3, for example, and may use vector instructions, e.g., SIMD instructions. Alternatively, other SIMD architectures may be used in which the processors utilize vector instructions having vector elements. Thus, source code may be optimized by a compiler for execution on these SPEs 120-134 or PPE 110 with Power ISA or FP only SIMD ISA extensions, by extracting parallelism from the source code and reconfiguring or transforming the source code to take advantage of this parallelism. In analyzing source code for optimization and transformation into SIMD vectorized code, the compiler may perform "if-conversion" operations. For example, such if-conversion may be performed using data parallel if-conversion mechanisms and data-parallel select operations as have been previously discussed above.

As discussed above, when code is SIMDized, i.e. vectorized for execution on a SIMD enabled processor, problems arise in handling exceptions that normally are not a problem for the original predicated code. As noted above, the predicated code instructions will either write their result, because the instructions generate a single result in which case it is written and an exception is raised if appropriate, or the instructions do not write a single result, in which case the result is not written and no exception is raised. However, with SIMD vectorized instructions, these instructions may generate a plurality of results without knowing whether a particular result will be used or not, i.e. whether a value is speculative or not, and thus, it cannot be determined what the right set of exceptions to generate are. Thus, in known SIMD architectures, either exceptions are enabled, in which case spurious exceptions may be generated and handled even in paths of execution that are not actually executed by the processors, i.e. speculative paths of execution, resulting in wasted cycles, or exceptions are suppressed with it being determined much later that a problem occurred, requiring complex trace back operations for debugging mechanisms.

With the mechanisms of the illustrative embodiments, however, instead of having to suppress exceptions due to the inability to determine an appropriate set of exceptions for data parallel if-converted loops, the mechanisms of the illustrative embodiments provide per-vector element tracking of exception conditions in a dataflow driven manner. With this per-vector element tracking, exceptions are recorded in the vector elements as special recognizable characters or bit patterns which may later be used to generate an exception with associated exception handling being performed, such as when it is determined what execution path was taken in the execution of SIMD vectorized code. In other words, exceptions in speculative paths of execution are deferred until a point at which the speculative path of execution becomes non-speculative, such as with a store instruction or move instruction that causes speculative data to become non-speculative.

Moreover, the illustrative embodiments provide an ability to propagate and supersede exception information. That is, the exception information may be propagated until it is determined whether a path of execution is taken that involves that exception. If a different path of execution is taken, then an exception may be superseded, i.e. the special characters or bit patterns may be ignored and may not generate an exception requiring exception handling. Alternatively, if a path of execution involves a vector element that has a special character or bit pattern stored in the vector element, then the corresponding exception may be generated and exception handling performed at the time that it is determined that the path of execution is no longer speculative in nature.

For example, it should be noted that with data parallel select operations, such as that described above, the data parallel select operation combines results from multiple paths. Not selecting, by the data parallel selection operation, a vector element having the special characters or bit pattern indicating an exception value, makes the exception disappear from a result exception set for that vector slot. In this way, exceptions are propagated for each vector slot based on the data flow.

Furthermore, the mechanisms of the illustrative embodiments provide an ability to store vector exception information in vector elements and raise exceptions by specific operations, such as a store-and-indicate instruction and/or a move-and-indicate instruction, to transfer execution to an appropriate exception handler. With these mechanisms of the illustrative embodiments, recognition of exceptions are essentially decoupled with the actual handling of the exceptions, with mechanisms provided to track these exceptions due to the decoupling.

In one illustrative embodiment, the mechanisms of the illustrative embodiment exploit the encoding of floating point numbers to diagnose and track exceptions for overflow conditions and illegal operations. The illustrative embodiment utilizes Institute of Electrical and Electronics Engineers (IEEE) values to indicate exception conditions, e.g., infinity represents an overflow condition and a NaN (Not a Number) value indicates an illegal operation. These IEEE values are stored in a vector element instead of a data element in cases where a corresponding exception occurs. These IEEE values are then propagated as the vector element until the vector element is to be persisted, e.g., stored, or moved from one register to another. Special store-and-indicate and/or move-and-indicate instructions are provided for identifying these special IEEE values in vector elements and generating the corresponding exceptions for handling by corresponding exception handlers. Thus, if these store-and-indicate or move-and-indicate instructions are not encountered during the execution flow, then these exceptions are not generated.

With the mechanisms of the illustrative, when a compiler is optimizing and transforming code, the compiler performs data parallel if-conversion to implement a SIMD ISA or floating-point only SIMD ISA, by translating if instructions into data parallel select operations, i.e., performing FP-oriented data-parallel if conversion. Moreover, the compiler provides support for storing exception values, i.e. special characters or bit patterns, in the vector elements of such a data parallel select operation when the calculations associated with the vector elements result in an exception being generated. These special characters, values, or bit patterns do not immediately generate the exception but simply indicate that an exception would have been generated and should be generated at a later time if the execution path, or data path, corresponding to the vector element is selected to be persisted by converting its state from a speculative state to a non-speculative state. Thus, if a calculation results in an overflow condition, the corresponding vector element stores an infinity value, bit pattern, or the like, to indicate that an overflow exception should occur if this data path or execution path is followed. Moreover, if a calculation results in an illegal operation, then a NaN value, bit pattern, or the like, is stored in the corresponding vector element to indicate that an illegal operation exception should occur if this data path or execution path is followed. Such support for storing such values to the vector elements instead of data values may be provided in the QPU 320 in FIG. 3, for example.

Figures 4A, 4B:
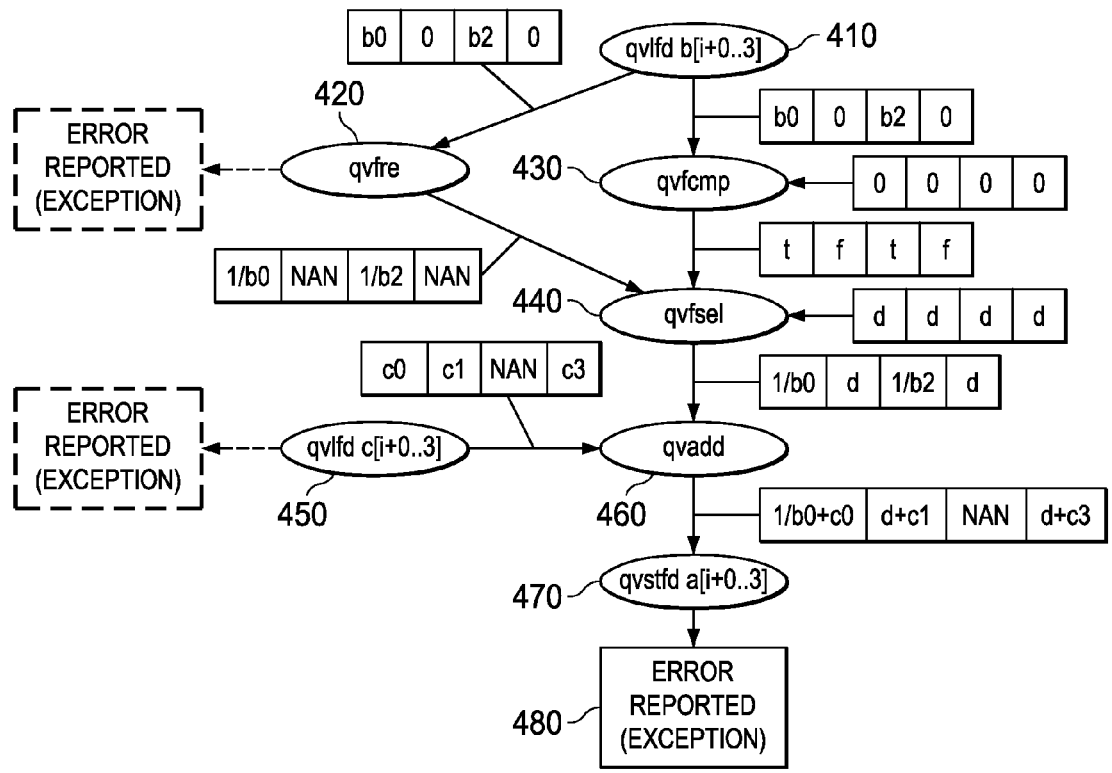
FIGS. 4A and 4B are example diagrams illustrating an execution of a data parallel select operation operating on one or more vector elements having an exception value stored within the vector element and being propagated in accordance with one illustrative embodiment.

FIGS. 4A and 4B are example diagrams illustrating a data parallel select operation operating on one or more vector elements having an exception value stored within the vector element in accordance with one illustrative embodiment. FIG. 4A is an example of code that implements a data parallel select operation while FIG. 4B is a graphical representation of the code in FIG. 4A illustrating the vector values generated as a result of the instructions in the code and how these vector values change, in accordance with the illustrative embodiments. The data parallel select operation, in the case of the code shown in FIG. 4A, is the instruction "QVFSEL," which may be inserted into the code 4A through a compiler optimization as mentioned above, for example. FIG. 4B shows how the data parallel select operation may propagate the special codes of the illustrative embodiments rather than causing an exception to be thrown and may be used to ignore conditions that might result in an exception being thrown in cases where the execution path or data path is not followed by the execution of the code. FIG. 4B further shows how those special codes that are in the selected path of execution are propagated until a non-speculative instruction causes such special codes to be persisted to memory, a vector register, or the like, which then causes the exception to be thrown and exception handling to be invoked. FIGS. 4A and 4B will be referred to herein collectively when describing the operation of the illustrative embodiments.

It should be noted that the instructions shown in FIGS. 4A and 4B are assumed to be executed in a speculative state until the results of these instructions are persisted to memory or are otherwise persisted to another vector register as part of a non-speculative instruction execution. In the examples of the illustrative embodiments set forth herein, such non-speculative instructions include a store instruction and a move instruction, discussed in greater detail hereafter.

As shown in FIGS. 4A and 4B, for this portion of SIMD vectorized code, the quad vector load floating point data (QVLFD) instruction 410, which loads four data values into four slots of a vector register, loads a first set of values of the vector QBI. As shown in FIG. 4B, in the depicted example, the four values for QBI that are written to the vector register are {b0, 0, b2, 0}. A quad vector floating point reciprocal value is generated by the execution of the QVFRE instruction 420 resulting in values {1/b0, NAN, 1/b2, NAN}. The Not-a-Number (NAN) values are generated by the reciprocal of 0, i.e. 1/0, which in the IEEE standard generates a Non-a-Number value. Typically, when such a NAN result is generated, an error is reported, i.e. an exception is thrown, that causes the execution of the code to branch to an exception handler which performs predefined operations for handling the exception type. Since the execution of the instruction 420 is speculative, there is no guarantee that either of the NAN values in the vector register will actually be persisted to memory or a vector register by a non-speculative instruction and thus, the branching to an exception handler will result in wasted processor cycles and resources.

However, with the mechanisms of the illustrative embodiments, rather than immediately generating an exception that requires handling by an exception handler, the exception is temporarily suppressed, or deferred, until the actual exception value, in this case the NAN, is persisted to memory, moved from one vector register to another, or otherwise used by a non-speculative instruction. Thus, the exception value is simply propagated through the execution flow until it is utilized by a non-speculative instruction in which case the exception is thrown and exception handling is invoked. If the exception value is never used by a non-speculative instruction, the exception is never thrown and does not negatively impact the execution flow.

Returning to the example shown in FIGS. 4A and 4B, the vector loaded by the QVLFD instruction 410 is also input to the quad vector floating point compare (QVFCMP) instruction 430 which compares the values of the slots in the vector with a zero value vector, i.e. {0, 0, 0, 0}. Essentially the QVFCMP instruction 430 determines if a value in the loaded vector {b0, 0, b2, 0} is non-zero. If so, a true value is generated; otherwise, a false value is generated. The "true" or "false" values for each vector value in the vector {b0, 0, b2, 0} are then stored to a vector {t, f, t, f} in this case. This vector is input, along with the vector {1/b0, NAN, 1/b2, NAN} output from QVFRE instruction 420, to a data parallel select instruction, QVFSEL instruction 440. A third vector {d, d, d, d} is provided as input to the QVFSEL instruction 440 for providing default values.

The QVFCMP instruction 430 essentially generates a mask vector {t, f, t, f} for masking out the zero values in the loaded vector {b0, 0, b2, 0} when they result in a NAN value due to the QVFRE instruction 420. That is, the QVFSEL instruction 440 determines, for each slot in the vector {1/b0, NAN, 1/b2, NAN} which is propagated to the QVFSEL instruction 440, whether to select either the value from the vector {1/b0, NAN, 1/b2, NAN} or a default value from the default vector {d, d, d, d}. This determination is made based on whether or not a true value is present in a corresponding slot of the output vector of the QVFCMP instruction 430, i.e. {t, f, t, f} in this example. Thus, as a result of the QVFSEL instruction 440 operating on the three vectors {1/b0, NAN, 1/b2, NAN}, {d, d, d, d}, and {t, f, t, f}, the vector value {1/b0, d, 1/b2, d} is generated. One can see that the NAN values are no longer an issue at this point in the execution flow. If an exception had been generated based on the operation of the QVFRE instruction 420 as in known mechanism, the exception handling would have caused resources and processor cycles to be wasted handling an exception condition that did not affect the ultimate execution flow of the computer code since the exception value is not being used in any way. If this were the final output of the code and the vector value {1/b0, d, 1/b2, d} were used by a non-speculative instruction, such as by persisting the vector to memory using a quad vector store floating point data (QVSTFD) instruction, no exception would ever be thrown and thus, exception handling is avoided, since the vector used by the non-speculative instruction does not include any special exception values indicating an exception or error condition that requires handling.

However, in the depicted example, the vector value {1/b0, d, 1/b2, d} is not the final result but instead is added to the output of another quad vector load floating point data instruction 450 which loads a vector {c0, c1, NAN, c3}. The quad vector add (QVADD) instruction 460 adds the vector {c0, c1, NAN, c3} to the vector {1/b0, d, 1/b2, d} which results in the vector output {1/b0+c0, d+c1, NAN, d+c3}. This vector output is provided to a non-speculative quad vector store floating point data (QVSTFD) instruction 470 which persists the vector output {1/b0+c0, d+c1, NAN, d+c3} to memory. Since a non-speculative instruction 470 is now using a vector having a special exception condition value, NAN, an error is reported, i.e. an exception is thrown, which results in branching of the execution flow to a routine for handling the error condition, i.e. an exception handler. Thus, while the NAN values in the output from the QVFRE instruction 420 did not result in an exception in the final output received by the QVSTFD instruction 470, the NAN value in the output of the QVLFD instruction 450 caused an exception value to be propagated down the execution flow to the non-speculative instruction 470, thereby causing a deferred exception to be thrown.

As noted above, in known systems, immediately when the QVLFD instruction 450 generated the NAN result, an exception would have been thrown and branching of execution would have been performed to the exception handler. However, in the illustrative embodiments, the NAN value is propagated until it is either superseded, such as in the case of the QVFSEL instruction 440 of the depicted example, or it is used by a non-speculative instruction, thereby causing the exception to be thrown. This allows the handling of the exception to be deferred until it is determined that exception handling is necessary and allows the exception to be superseded in instances where the exception does not affect the execution flow.

With reference again to FIG. 3, it should be appreciated that the memory vector operations, e.g., loads and stores, described above may be executed by load/store units LS1 254 and LS2 258 in FIG. 3 with writing and reading of values from the vector register file 330. Other non-memory vector operations, such as computations and the like, may be executed through the quad processing unit (QPU) issue unit 310 and QPU 320 with results being written to vector register file 330. A compiler may optimize and SIMD vectorize computer code such that the mechanisms for propagating exception values with deferred exception handling is performed in the compiled code that is executed by these mechanisms of the processor architecture in FIG. 3.

Thus, rather than generating exceptions and having to handle those exceptions in paths of execution not actually followed by the execution of the program, the mechanisms of the illustrative embodiments decouple the identification of the exception condition from the actual handling of the exception such that only those exception conditions actually encountered by the execution flow of the program are actually handled. As a result, processor cycles are not wasted on handling exceptions that do not actually affect the execution of the program.

In order to provide this decoupling, support is provided for setting the special values in the vector elements in response to a detection of an exceptional condition as described above. Moreover, special instructions are provided for recognizing such special values and generating the appropriate exceptions should those special values in the vector elements be encountered during the execution of the program, i.e. should a data path or execution path be selected, such as by a data parallel select operation, that involves that vector element. These special instructions, in one illustrative embodiment, are a store-and-indicate instruction and a move-and-indicate instruction. A compiler, when optimizing and transforming an original portion of code for SIMD vectorized execution, may replace normal store or move instructions of the original portion of code with such store-and-indicate or move-and-indicate operations.

While store-and-indicate and move-and-indicate instructions are utilized in the illustrative embodiments, it should be appreciated that the illustrative embodiments are not limited to such. Rather, any non-speculative instruction may have a corresponding X-and-indicate version of that non-speculative instruction, where "X" is some operation performed by the non-speculative instruction. The store-and-indicate and move-and-indicate instructions are only examples of the types of non-speculative instructions that may be used to provide exception indications in accordance with the illustrative embodiments.

FIG. 5 is an example diagram illustrating a store-and-indicate instruction in accordance with one illustrative embodiment. As shown in FIG. 5, the store-and-indicate instruction, referred to in FIG. 5 as the quad-vector store floating point single indexed and indicate instruction, determines if bytes of the vector elements of a quad-vector register QRS indicate a not-a-number (NaN) or an infinity (Inf) value. Of particular note in FIG. 5, the quad vector store floating point single indexed and indicate instruction includes a code, 31, that is used by the processor architecture to recognize the instruction as a quad vector store floating point single indexed and indicate instruction, a quad vector register input vector QRS, and identifiers of scalar registers RA and RB that hold the values used to compute the effective address for the result of the instruction.

In the depicted example, a first vector element of the quad-vector register QRS corresponds to bytes 0:7, a second vector element corresponds to bytes 8:15, a third vector element corresponds to bytes 16:23, and a fourth vector element corresponds to bytes 24:31. If any of these vector elements indicate a NAN value or a INF value, then a QPU exception is indicated. It should be noted that while a store-and-indicate instruction is shown in FIG. 5, a similar move-and-indicate instruction may be provided that performs such checks for NAN and INF values in the vector elements.

As shown in FIG. 5, these checks are performed only if a corresponding value QPU_enable_indicate_NaN or QPU_enable_indicate_Infinity is set to an appropriate value. These values may be set in appropriate control registers of the QPU 320 in FIG. 3, for example. The values in these control registers may indicate whether the QPU 320 is to monitor for NaN or Infinity values and use them to track exceptions. Only when these values are set in the control registers will the QPU 320 in FIG. 3 actually perform the functions of storing a special exception value indicative of an exception condition in the vector elements and performing the checks for these special values in the vector elements with the store-and-indicate or move-and-indicate instructions.

Figures 6, 7A:
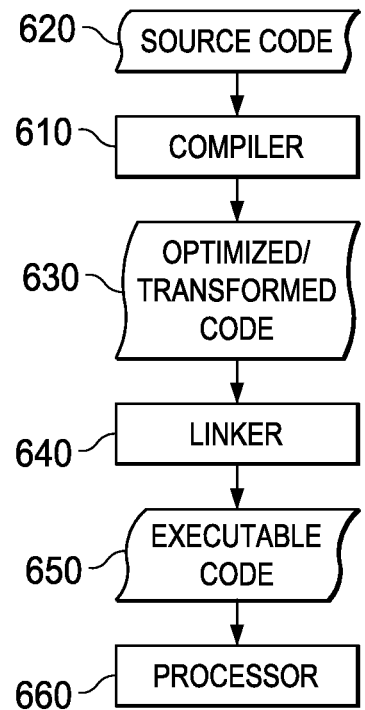
FIG. 6 is an exemplary block diagram of a compiler in accordance with one illustrative embodiment.
FIG. 7A is an example diagram illustrating a set of conditions for which a test for overflow on a divisor register may be performed to detect lost exception conditions in accordance with one illustrative embodiment.

FIG. 6 is an exemplary block diagram of a compiler in accordance with one illustrative embodiment. As shown in FIG. 6, the compiler 610 receives original source code 620 which is analyzed in accordance with the illustrative embodiments for which the compiler 610 is configured. That is, the compiler 610 identifies portions of the source code 620 that have loops with conditional control flow that may be modified for SIMD or FP-only SIMD vectorized execution. Such portions of source code 620 may be transformed by data parallel "if" conversion using data parallel select operations that implement the mechanisms of the illustrative embodiments for storing exception condition values in vector elements and generating exceptions only when a data path or execution path corresponding to the vector element is selected and the vector element's value is stored or moved. The compiler 610 may replace store and/or move instructions of the original source code 620 with store-and-indicate and/or move-and-indicate instructions that recognize such exception condition values in vector elements and generate instructions accordingly. In other illustrative embodiments, other types of non-speculative instructions may be replaced with corresponding versions of these instructions that are modified to support an X-and-indicate type of operation in which the non-speculative instruction performs its normal operation but then also provides an indication of any exception conditions that are enabled in the architecture and which are found to exist in the inputs to the X-and-indicate type instruction.

The result of the optimization and transformation performed by the compiler is optimized/transformed code 630 that implements the optimizations and transformations of the illustrative embodiments. The optimized/transformed code 630 is then provided to linker 640 that performs linker operations, as are generally known in the art, to thereby generate executable code 650. The executable code 650 may then be executed by the processor 660, which may be a processor in the CBE 100 of FIG. 1, for example, or another data processing system architecture.

It should be noted that there are instances where exception conditions may be lost or exception conditions may be changed prior to a store-and-indicate or move-and-indicate instruction being executed. Tests may be provided in the QPU 320 in FIG. 3, for testing for such conditions when desirable. For example, conditions may occur where a vector element having an infinity value (INF) is input but the output of the calculation is a "0." If such a condition needs to be detected, the QPU 320 may check the divisor for an overflow condition, i.e. the QPU 320 may have logic to check the divisor register for the special value of Inf. If such a special value is detected, then an overflow exception can still be generated when such a condition is encountered by the execution of the program. FIG. 7A is an example diagram illustrating a set of conditions for which a test for overflow on a divisor register may be performed to detect lost exception conditions in accordance with one illustrative embodiment. As can be seen from FIG. 7A, this condition occurs where the divisor has a value of "INF" and the operand is −1, −0, 0, or 1.

Another condition in which exceptions may be lost is the condition under which an overflow condition (INF) is converted to an illegal operation condition (NAN). Such situations occur when calculations involve INF−INF, 0* INF, or other types of calculations of this sort. Often times, merely detecting that there is an exception is sufficient and it is not important whether the exception is an overflow exception or an illegal operation exception, such as when both types of exceptions are enabled by the setting of the control register values QPU_enable_indicate_NaN and QPU_enable_indicate_Infinity. However, in other instances, such as when only one type of exception is enabled, it may be important to distinguish between the types of exceptions. In such situations, it is important to test for conditions under which an overflow exception may be converted to an illegal operation exception.

Figure 7B:
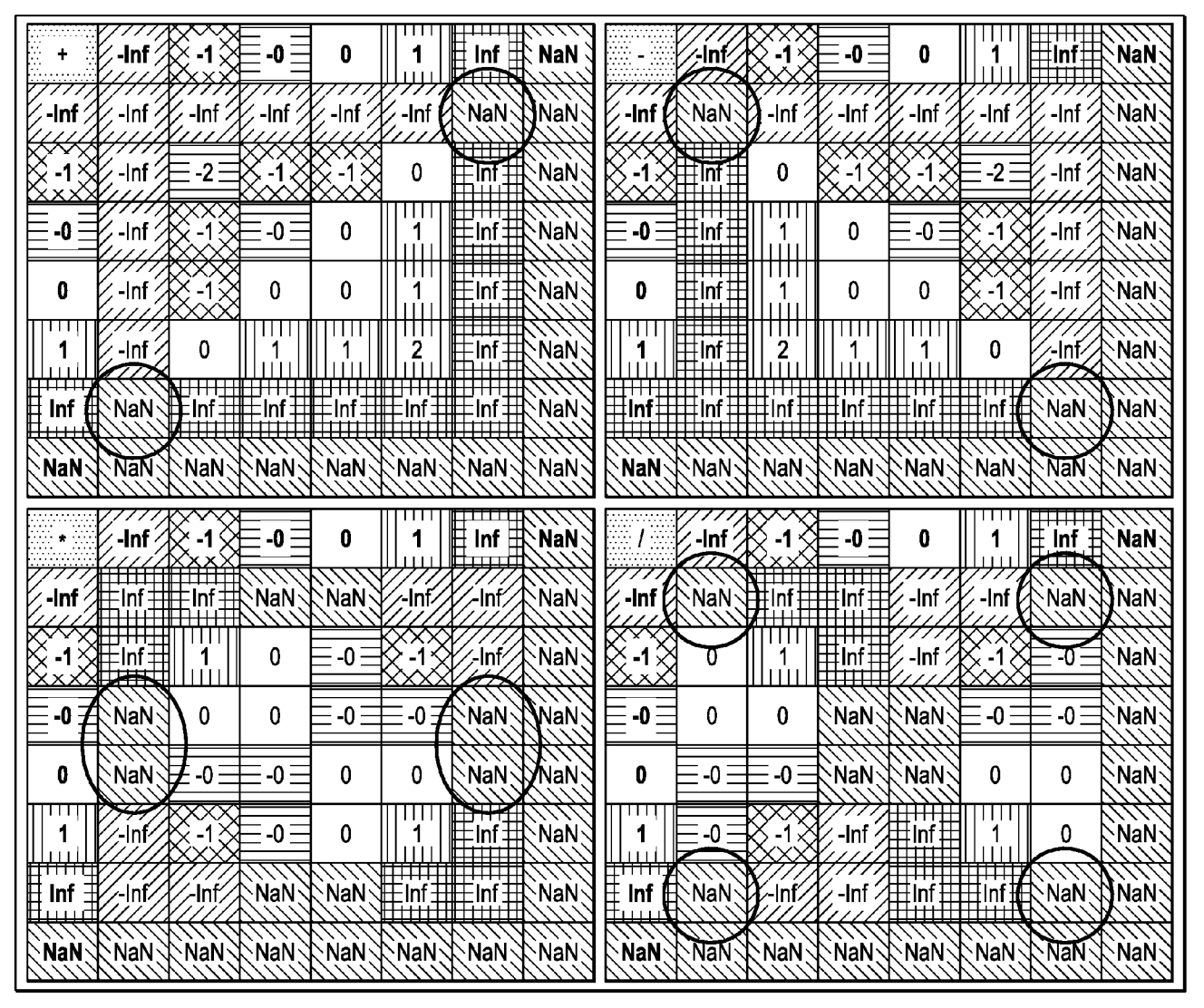

If there is a need for such a test, the QPU 320 may be provided with logic for checking the operand and/or divisor register for an overflow value. FIG. 7B is an example diagram illustrating a set of conditions for which a test for overflow on an operand register may be performed to detect an overflow-to-NAN change condition in accordance with one illustrative embodiment. As shown in FIG. 7B, for an addition operation or subtraction operation, the operand and divisor register values may be checked for overflow conditions and if both have INF values, then an overflow exception may be generated, instead of the otherwise indicated illegal operation exception, as indicated in FIG. 7B. Moreover, for a multiplication operation, if the divisor register is an overflow value and the operand register has a 0 value, then an overflow exception may be generated instead of the otherwise indicated illegal operation exception. Similarly, for a division operation, if the divisor register has an overflow value and the operand register has an overflow value, then an overflow exception may be generated instead of the otherwise indicated illegal operation exception.

Figure 8:
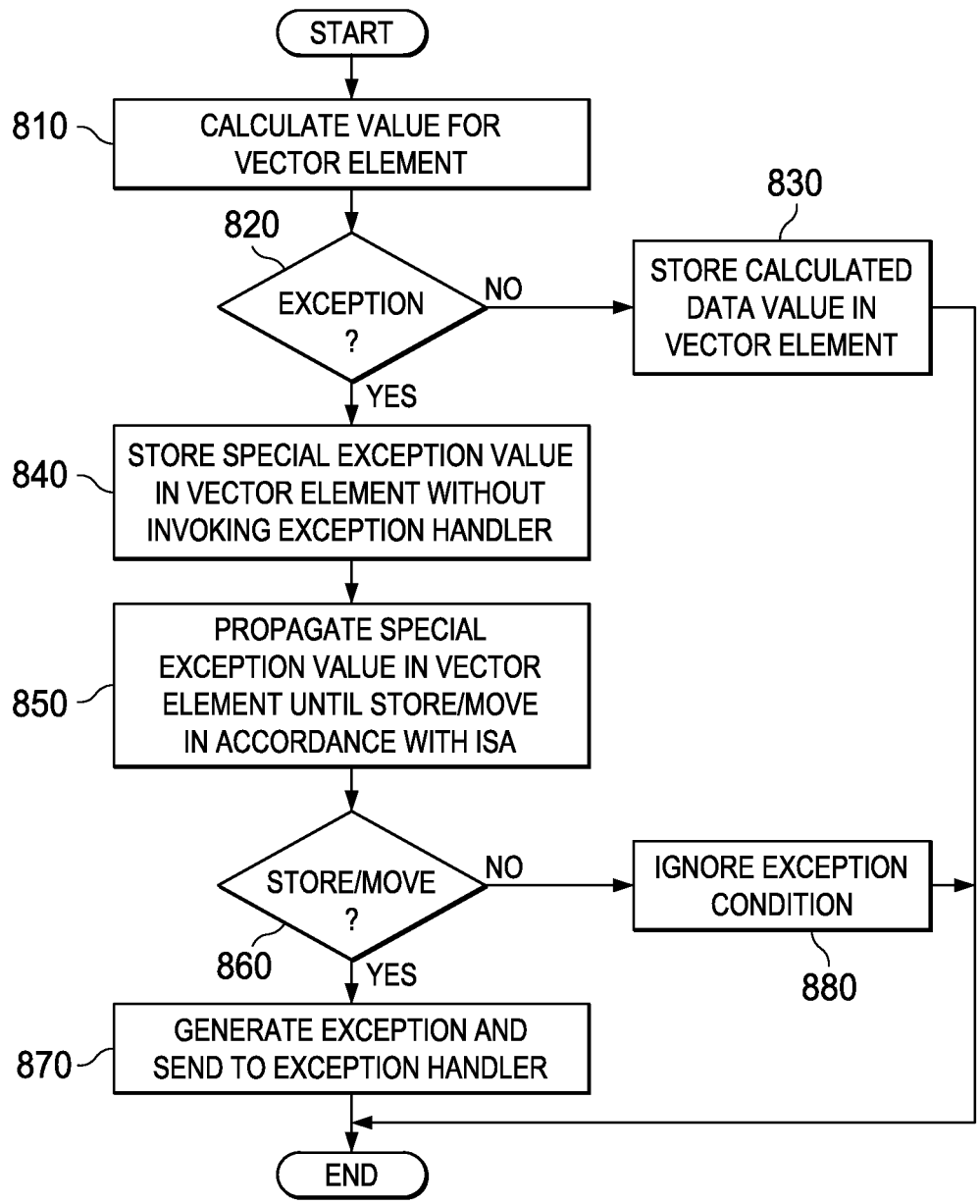
FIG. 8 is a flowchart outlining an example operation for setting a value of a vector element in accordance with one illustrative embodiment.

FIG. 8 is a flowchart outlining an example operation for setting a value of a vector element in accordance with one illustrative embodiment. As shown in FIG. 8, the operation starts by performing an operation on a vector element of a target vector (step 810). A determination is made as to whether an exceptional condition is encountered during the calculation (step 820). If not, then the calculated result data value is stored in the vector element (step 830). If an exceptional condition is encountered, then a special exception value corresponding to the exceptional condition is stored in the vector element without invoking the exception handler (step 840). The special exception value is propagated in the vector element through the processor architecture until a store/move operation is encountered or the special exception value is superseded, in accordance with the instruction set architecture being utilized (step 850). It should be noted that in some instances, the propagation of the special exception value may involve superseding this value such that the exception value essentially disappears in the execution flow. For example, as discussed above, the data parallel select instruction described above in the example of FIGS. 4A and 4B causes the exception value to terminate propagation in instances where the exception condition is masked or where it is not used by a non-speculative instruction.

A determination is made as to whether a non-speculative instruction, such as a store-and-indicate or move-and-indicate instruction, is encountered during the execution of the computer program that targets the vector in which the vector element is present (step 860). If not, the exceptional condition is ignored (step 880). If a store-and-indicate or move-and-indicate instruction is encountered, then an exception is generated and sent to the exception handler (step 870). The operation then terminates.

Figure 9:
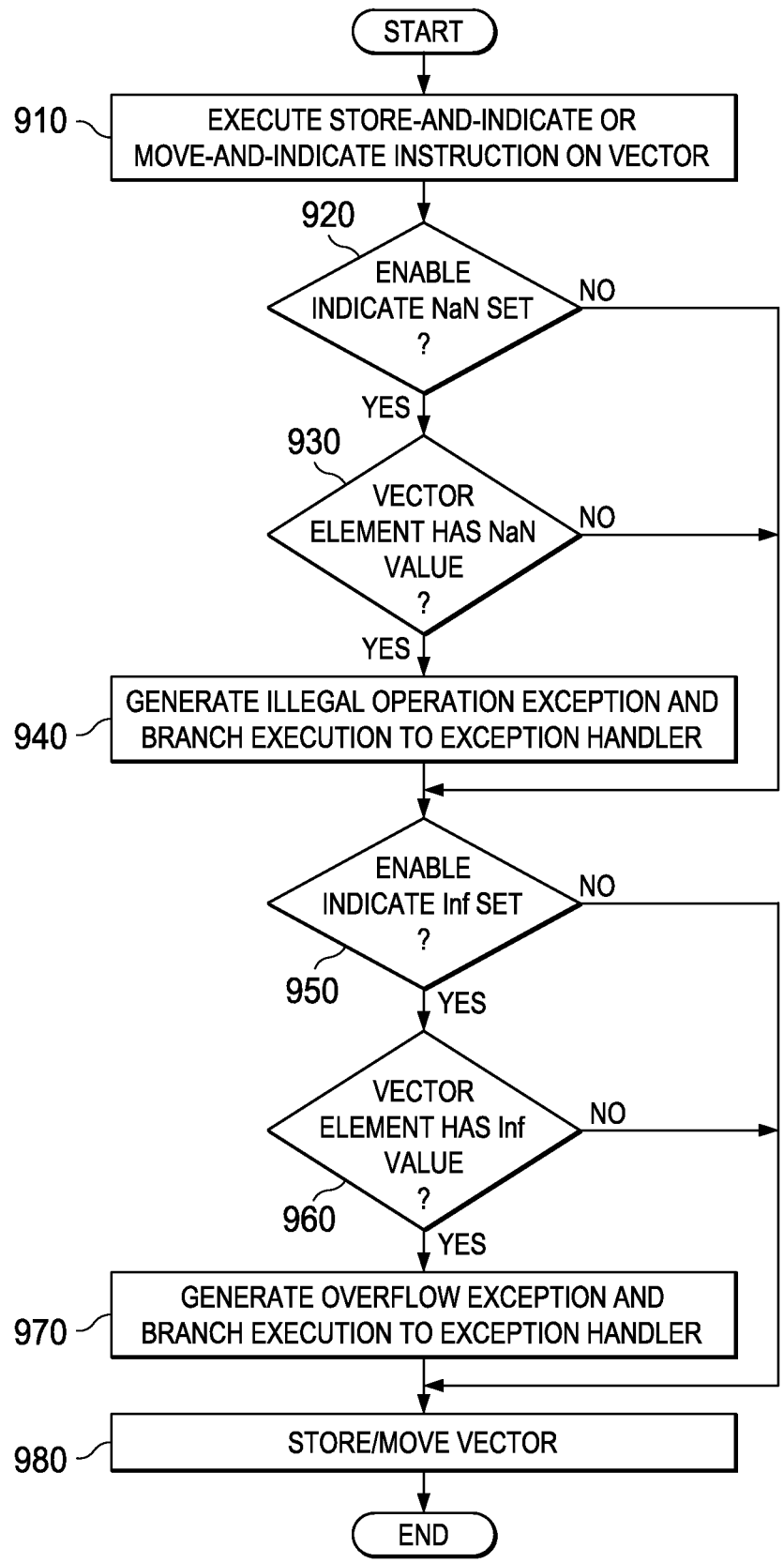
FIG. 9 is a flowchart outlining an example operation for generating an exception in accordance with one illustrative embodiment.

FIG. 9 is a flowchart outlining an example operation for generating an exception in accordance with one illustrative embodiment. As shown in FIG. 9, the operation starts with a store-and-indicate or move-and-indicate instruction being executed on a vector (step 910). A determination is made as to whether a control register has a corresponding enable_indicate_NaN value set or not (step 920). If so, a determination is made as to whether any of the vector elements of the vector has a NAN value (step 930). If so, then an illegal operation exception is generated and sent to an appropriate exception handler (step 940).

Otherwise, or if the enable_indicate_NaN value is not set in the control register, a determination is made as to whether an enable_indicate_Inf value is set in a corresponding control register (step 950). If so, then a determination is made as to whether any vector element of the vector has a INF value (step 960). If so, then an overflow exception is generated and execution branches to the corresponding exception handler (step 970). Thereafter, if a vector element does not have an Inf value, or if the enable_indicate_Inf value is not set in the control register, the vector is stored/moved (step 980) and the operation terminates.

It should be noted that the NAN and INF values are only used as examples of special exception values that may be used by the mechanisms of the illustrative embodiments to identify exception conditions possibly requiring exception handling. A similar operation may be performed with regard to any other type of special indicator values that may be used to indicate an exception condition having been encountered during speculative execution of instructions, without departing from the spirit and scope of the illustrative embodiment.

Thus, the illustrative embodiments provide mechanisms for detecting exception conditions and propagating a special exception value indicative of the exception condition as part of a corresponding vector element of a vector without immediately invoking an exception handler. Only when the special exception value is actually encountered as part of the execution of the computer program is the corresponding exception generated and execution branched to the exception handler. In this way, detection of exception conditions and handling of exceptions are decoupled from one another allowing exception conditions in branches of execution that are not part of the actual execution path taken by the computer program to be ignored. The mechanisms of the illustrative embodiments allow SIMDized code to enable exceptions while minimizing spurious exceptions and exception handling in branches of execution not actually followed by the execution path of the computer program.

The above illustrative embodiments are described as having the compiler convert existing store or move instructions to store-and-indicate or move-and-indicate instructions. However, it should be appreciated that it is not necessary for the compiler to convert every store or move instruction to a store-and-indicate or move-and-indicate instruction. To the contrary, in accordance with further illustrative embodiments, the compiler may be provided with logic for selecting appropriate locations within code where store or move instructions are to be converted to store-and-indicate or move-and-indicate instructions. Moreover, as noted above, the illustrative embodiments are not limited to only store-and-indicate or move-and-indicate instructions but rather, the compiler may utilize any X-and-indicate type instruction, where X is some operation to be performed, e.g., add-and-indicate, or the like. Thus, the compiler may select appropriate locations for such X-and-indicate type instructions based on the logic provided within the compiler, as the compiler is converting source code, e.g., scalar code, to SIMD vectorized code.

With the mechanisms of the illustrative embodiments, in transforming the source code, e.g., scalar code, into SIMD vectorized code, X-and-indicate instructions, such as a move-and-indicate, store-and-indicate, or the like, (collectively referred to as "indicate" instructions) are inserted into the code at appropriate locations to take advantage of the use of the special values identifying the occurrence of an exception condition. The compiler determines the appropriate insertion point according to one or more methodologies based on whether a value of interest is checkable or not checkable, as defined hereafter. In one methodology, portions of SIMD code that are not checkable may be transformed into checkable SIMD code through the use of masking mechanisms. In one methodology, the indicate instructions may be inserted after every computation involving a value of interest, e.g., an array of values of interest. In another methodology, a minimum number of check instructions is inserted at appropriate locations so as to test each live output value, where a value is live if it eventually impacts the storage image or decision process of the code (or a successive computation will use the result to eventually impact the storage image or decision process of the code).

To illustrate an example embodiment of the logic that may be employed by the compiler when determining where to insert such X-and-indicate instructions in code being optimized and compiled by the compiler, an overview flow of the logic will first be described with the details of each of the operations outlined in this flow being provided thereafter. It should be appreciated that the flow and the details thereafter are only one example of logic that may be used for insertion of X-and-indicate type instructions and other logic may be used by compilers implementing the mechanisms of the illustrative embodiments without departing from the spirit and scope of the illustrative embodiments.

Figure 10:
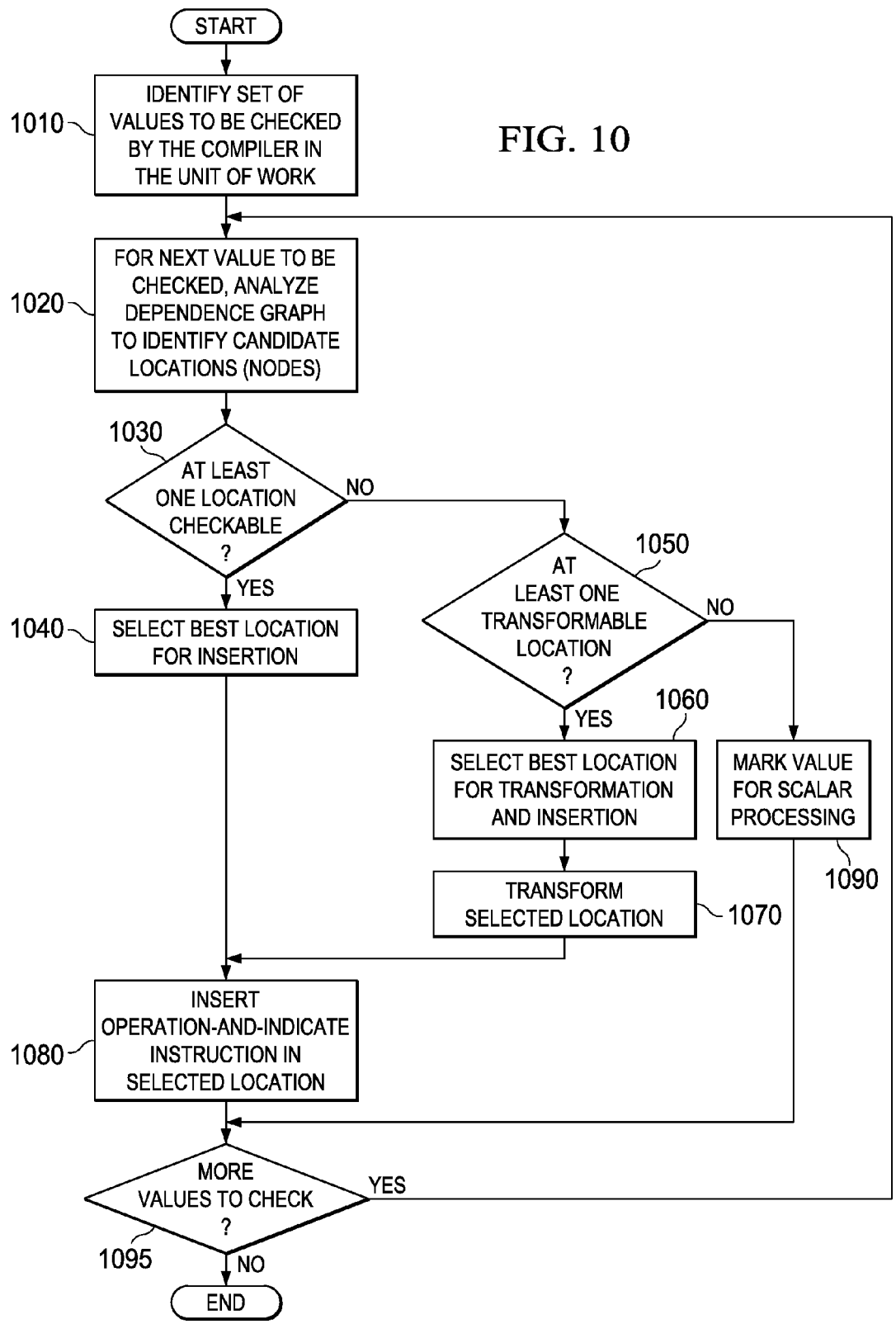
FIG. 10 is a flowchart outlining an example operation for insertion of indicate instructions into SIMD vectorized code by a compiler in accordance with one illustrative embodiment.

FIG. 10 is a flowchart outlining an example operation for insertion of indicate instructions into SIMD vectorized code by a compiler in accordance with one illustrative embodiment. The operation of FIG. 10 assumes that a dependence graph has been generated by the compiler for a given portion of code that is to be checked by the compiler. The portion of code may be a basic block, a statement, an expression, or any other unit of work or code upon which the compiler may operate. Compiler generation of dependence graphs for a portion of code that is to be checked by the compiler is generally known in the art and thus, a detailed description is not provided herein. As is generally known in the art, a dependence graph comprises nodes and arcs between nodes where the arcs represent dependencies between portions of code, e.g., instructions that are dependent upon other instructions.

As shown in FIG. 10, for a unit of work that is to be checked by the compiler, a determination is made as to a set of values that need to be checked by the compiler (step 1010). For each value that needs to be checked, the dependence graph is analyzed to determine a set of locations, i.e. nodes, in the dependence graph that provide an equivalent coverage, i.e. a location at which a check may be performed that is equivalent to checking at each node of the graph that involves that value (step 1020).

Consider for example the computation "c[i]=(a[i]+b[i])+1" where one wants to detect a Not-A-Number (NAN) exception. To do this, one must check that the input value generated by a[i] is not a NAN. Thus, one could check the outcome of the load operation loading the a[i] value from memory into the register file. However, given that adding a number to a NAN value also generates a NAN, checking the result of "a[i]+b[i]" provides an equivalent coverage (from the perspective of checking whether a[i] generates a NAN or not). In fact, checking "a[i]+b[i]" is more beneficial as it also check whether the b[i] value is a NAN or not. By extension, to check the value of a[i], checking the following locations are equivalent: "a[i]," "a[i]+b[i]," "a[i]+b[i]+1." In such cases, while all such locations are equivalent, it is clearly beneficial to check the second or the third location as it also check the value of "b[i]." Checking the last location is the cheapest, as one can transform the store of the computed value of "a[i]+b[i]+1" to memory location "c[i]" into a store-and-indicate.

When the unit of work is larger than a statement, there may be equivalent locations that span several statements. Consider statement "c[i]=(a[i]+b[i])+1" unconditionally followed by another statement "d[i]=c[i]+e[i]". In such case, one can add the "c[i]" and the "c[i]+d[i]" as equivalent locations to check for whether a[i] is a NAN or not.

A determination is made as to whether one or more of these identified locations can be checked (see definition of a "checkable" value or location hereafter) (step 1030). If so, a best one of these checkable locations is selected (step 1040).

If there are no checkable locations in the identified locations (step 1030), then a determination is made as to whether there are one or more locations that can be transformed into a checkable form (step 1050). If so, a best location for such checking is selected (step 1060) and the location is transformed such that the uncheckable part of the location is separated from the checkable part, e.g., by masking the uncheckable part of the register values of the output register at the location with safe values, performing loop peeling, or the like (step 1070). After operations 1040 or 1070, an operation-and-indicate instruction (also referred to as simply an "indicate" instruction) is inserted in the selected location (step 1080). This indicate instruction essentially checks for a special value indicative of an exception condition, which may have occurred due to previous computations but such exception handling was deferred in the manner previous described. If such a special value exists, then the exception is indicated by the X-and-indicate instruction and exception handling may be initiated.

If there are no checkable locations and there are no locations that can be transformed such that a portion is checkable, then the value computation corresponding to the value is marked as a scalar (step 1090). A determination is made as to whether other values in the unit of work need to be checked (step 1095). If so, the operation returns to step 1020 and the operation repeats for a next selected value. Otherwise, the operation terminates. Note that in the above embodiment, step 1050 determines if there is at least one transformable location. When that is the case, then the code will be transformed so as to make the code checkable. In another embodiment, step 1050 also checks if the code can be profitably transformed. Indeed, there may be cases where the additional cost of transforming the SIMD code so as to make it checkable may exceed the benefit of SIMDizing that statement. In such cases, it may be more beneficial to simply elect to proceed to step 1090 rather than transforming the code into SIMD code.

As described above, one of the principle determinations made by the compiler when determining where to insert indicate instructions is to determine what locations in the dependence graph are checkable or not. In determining whether a location in the dependence graph is "checkable" or not, the compiler looks at the register storing the resultant SIMD vector output value of the location in the dependent graph and determines if the value stored in the register is "checkable" or not. A value in a slot of a vector register is checkable if it (1) contains a floating point value that is live and the value was actually computed; or (2) the value is known to have a floating point representation that is guaranteed not to cause an exception. With regard to (1) above, as mentioned previously, a floating point value is "live" if the floating point value eventually impacts the storage image, i.e. the data stored in memory, or impacts the decision process of the code, e.g., impacts which branches of execution are taken during execution of the code. Alternatively, if a successive dependent computation uses the value and that computation impacts the storage image or decision process, then the value is also considered to be "live." The value must also be actually computed, i.e. not copied to or moved to the register but actually is the result of a computation. This excludes data that is simply read from memory so as to be spliced into the computations, for example.

With regard to (2) above, the user or a compiler may specific certain values as being guaranteed to not cause an exception. For example, the compiler may set certain sets of large values to zero. In such a case, the compiler may indicate that zero values do not cause an exception for such sets of large values. Thus, if such a value is in a SIMD vector register slot, this value may be considered to be checkable. Similarly, a user may specify certain values as not causing exceptions, and such values when encountered may likewise be checkable. For example, a computation may include data from a small coefficient table that is filled with known values. For example, a computation may repetitively use sin(x) values where x is a multiple of 10 degrees. A user may pre-compute the sin(0), sin(10), . . . sin(350) values, store their results in a small array, and then read such values for this array instead of computing the sin(x) each time. Because the user had full control over this table, and knows that its values are between −1.0 and +1.0, the user may assert to the compiler (via a directive, pragma, compiler flag, or other means of exchanging information to the compiler) that that table is guaranteed not to be NAN, negative Infinity, or positive Infinity.

A SIMD vector register is itself considered to be checkable if each of its slots stores a floating point value that is checkable, i.e. a floating point value that is "live" and actually computed or is known to not generate an exception. For example, in the example architecture discussed previously, each SIMD vector register is comprised of 4 slots or values. In such an architecture, each of the 4 slots must store a value that is checkable under the definition of checkable set forth above.

Figure 11A:
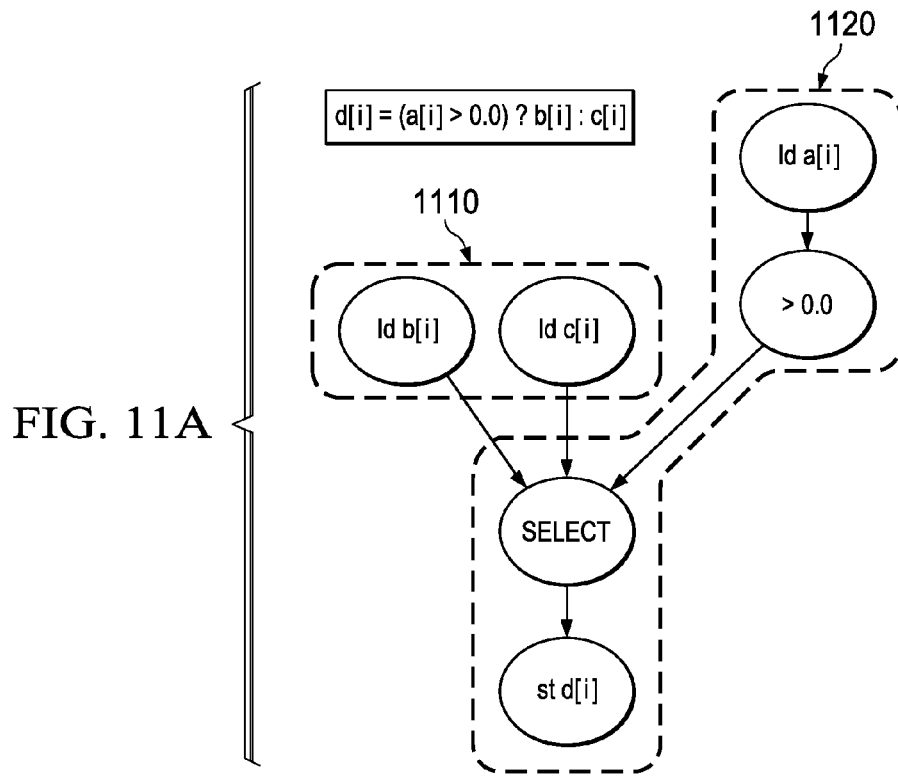
FIGS. 11A-11C are example diagrams illustrating the difference between checkable and uncheckable SIMD code portions in accordance with the criteria of one illustrative embodiment.
Figure 11B:
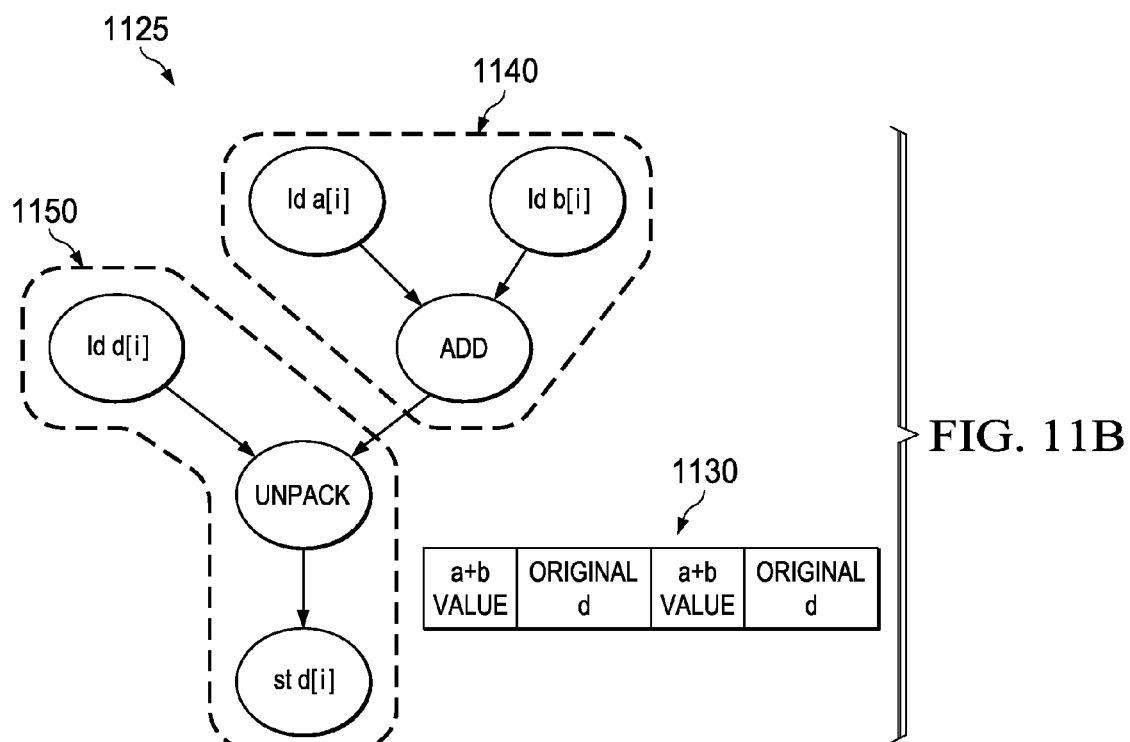
Figure 11C:
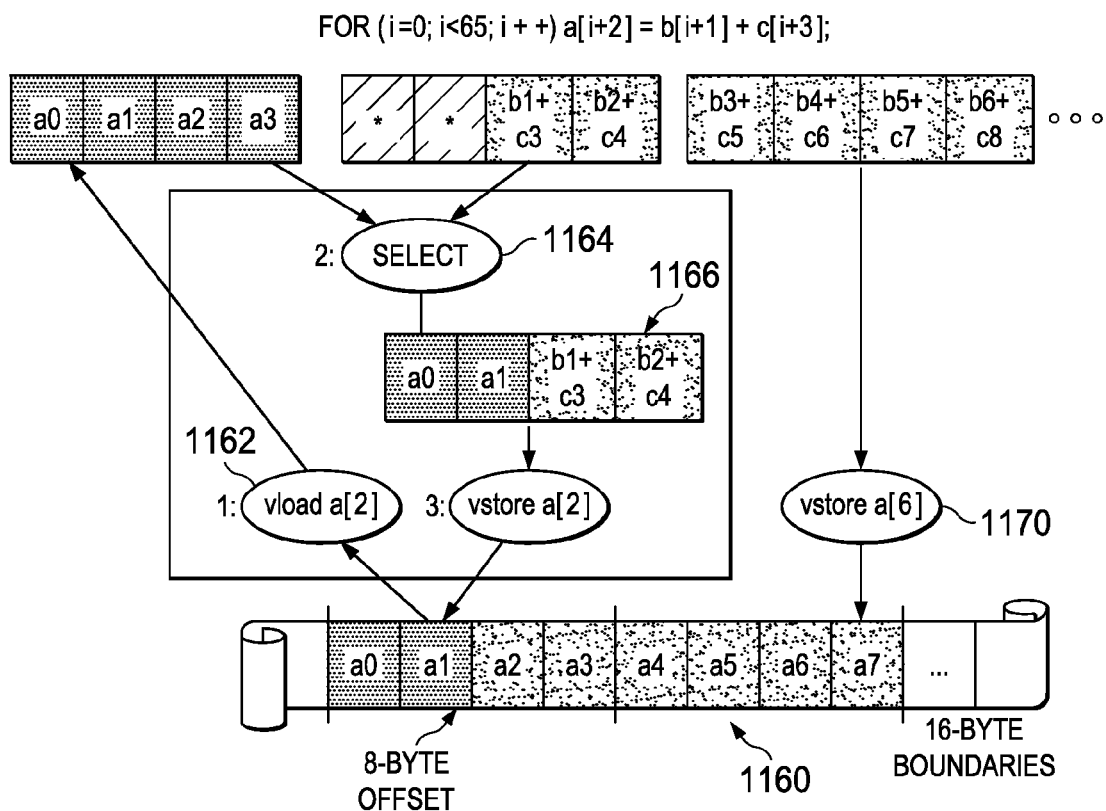

FIGS. 11A-11C are example diagrams illustrating the difference between checkable and uncheckable SIMD code portions in accordance with the criteria of one illustrative embodiment. In a first example, shown in FIG. 11A, the unit of work, or portion of code, that is being checked by the compiler is the statement d[i]=(a[i]>0.0) ? b[i]:c[i]. The resulting dependence graph of this statement is shown in FIG. 11A, as would be generated by a compiler when performing compilation of this statement, in a manner generally known in the art. However, in accordance with the mechanisms of the illustrative embodiments, nodes of the dependence graph may be categorized into checkable and non-checkable with regard to the values of the unit of work, i.e. the statement being checked by the compiler in this example.

As shown in FIG. 11A, the output of the instructions in the portion 1120 of the dependence graph are checkable in that the value a[i] affects a decision process of the code, i.e. the "select" operation in the SIMD code, based on the comparison of a[i] with the value "0.0." Essentially, the comparison of a[i] to 0.0 makes a mask in which, if the value of the mask is 1, a first value is taken, e.g., b[i], and if the value of the mask is 0, a second value is taken, e.g., c[i], by the following "select" instruction. As a result, the value in the store instruction st d[i] is affected by value a[i] and thus, is live and actually computed by the select instruction.

On the other hand, the output of the load instructions for the loads of b[i] and c[i] in portion 1110 of the dependence graph are not checkable since there is no guarantee that the results of these loads will actually be used in any way. It is known that one of the values generated by these loads will be used, but at compile time, the compiler cannot know which values will be used, i.e. either b[i] or c[i] could be used or not used at any time during execution. Thus, these values are not checkable by the compiler in their current state.

As a further example, consider the statement d[2i]=a[i]+b[i] for which the dependence graph 1125 and register values for the slots of the SIMD vector register d[i] 1130 are shown in FIG. 11B. As shown in FIG. 11B, under the definition of checkable provided herein, the portion 1140 of the dependence graph 1120 is checkable while the portion 1150 of the dependence graph 1120 is not checkable. The portion 1140 is checkable because it is known that the values a[i] and b[i] will be used to affect the value stored by the store instruction st d[i], i.e. they are live, and the values used to affect the value d[i] stored in memory are computed by the add instruction. The portion 1150 is not checkable since it is not guaranteed that all of the results of the load instruction ld d[i] will be used when storing d[i]. This is shown in the example of the vector register d[i] 1130 where a first value in slot 0, where i=0, is a value a[0]+b[0]. A second value in slot 1 is the original d[i] value loaded in this slot by the ld d[i] instruction since, when i=1, the value of the statement is d[2]=a[1]+b[1] and thus, slot d[2] is updated to store the value a[1]+b[1]. Similarly, for slot d[3], the value stored is the original value loaded by the ld d[i] instruction. Hence, the unpack instruction combines both values loaded via the ld d[i] instruction (which does not actually compute the values but merely loads them), and values calculated based on the vectors a[i] and b[i] from the add instruction. Since some values are checkable and others are not, the result of the unpack instruction, according to the definition of a checkable register having to have all slots store checkable values, is not checkable. As a result, the store instruction st d[i] is not checkable. This, however, may change should it be determined that all of the values in d[i] loaded by the instruction ld d[i] are values guaranteed not to generate exceptions.

FIG. 11C provides another example of checkable and uncheckable SIMD code in accordance with the illustrative embodiments. The example shown in FIG. 11C is for the statement for (i=0; i<65; i++) a[i+2]=b[i+1]+c[i+3] which is a read-modify-write operation. As shown in FIG. 11C, the input vectors are a[i], b[i], and c[i], where the vector value a[i] is read from memory 1160, modified by the addition of b[i+1]+c[i+3], and then written back to memory 1160. Since the SIMD architecture operates on vectors of 4 slots in this example, when a value a[2] is the subject of a read-modify-write operation, a vector load operation 1162 is performed to retrieve the value corresponding to a[2]. This involves the reading of value [a0, a1, a2, and a3] from memory 1160. The value of a[2] corresponds to a value of i=0 in the above statement which is evaluated to store the values [*, *, b1+c3, b2+c4]. These two vectors are input to a select operation 1164 which selects, for each slot of the output vector register 1166, either the original value loaded by the vector load instruction 1162, or the new value calculated by the statement. In this case, since the operation is a read-modify-write operation on the value a[2], the original values a0 and a1 are selected for the first two slots of the output vector register 1166 and the calculated values b1+c3 and b2+c4 are selected for the last two slots of the output vector register 1166.

The original values a0 and a1 are not checkable since it is not known ahead of time by the compiler whether these values will actually be used and these values are not actually calculated but rather only loaded from memory. Thus, these values a0 and a1 are not "live" under the definition set forth above and therefore, are not checkable. On the other hand, the calculated values b1+c3 and b2+c4 are checkable in that they are calculated and impact the storage image, therefore they are "live."

As noted above, for a SIMD vector register to be checkable, all of the values stored in the slots of the vector register must be checkable. Thus, the output vector register 1166 is not checkable since at least one value of the output vector register 1166 is not checkable, i.e. the slots storing values a0 and a1 are not checkable. For the vector store instruction 1170, however, the vector register whose values are being written to memory 1160 is checkable in that each slot in the vector register stores a value that is calculated according to the statement and thus, stores a "live" value.

Returning to the operation outlined in FIG. 10, as mentioned above, the operation determines locations that provide equivalent coverage. Of those locations, it is determined whether any of the locations is checkable, i.e. whether an output register of the corresponding instruction is checkable or not. In making such a determination, the criteria set forth above may be utilized by the logic of the compiler to determine whether the output register of the corresponding instruction is checkable or not. The compiler may analyze each identified location using such criteria and determine which locations are checkable.

As shown in FIG. 10, if none of the locations are checkable, a determination is made as to whether any of the locations can be transformed into a checkable location. Essentially, this determination is one in which the output register is analyzed to determine if any of the slots in the output register is checkable. If so, then the slots in the output register that are checkable are identified and a mask may be generated to mask off the non-checkable slots in the output register. The non-checkable slots in the output register may be masked off by replacing these values with values known to not generate an exception, e.g., a 0 value or other safe value that does not generate an exception. The mask may be applied prior to performing the check operation performed by an inserted X-and-indicate instruction, as described hereafter. The mask may be applied for purposes of the X-and-indicate instruction's operation. This masking action, however, does not change the behavior of the application (aside from the possible exception generated by the X-and-indicate operation) because the values of registers that are later used by the compiler for its computations are not changed. In other words, for the register that is to be checked, the non-checkable values are masked off (by replacing them with safe values) in a different vector register that will only be used by the X-and-indicate operation. If the checking is done by a store and indicate operation, the masked off value is stored into a memory location that is never read by the original program. For example, a memory location on the memory stack may be reserved just for such a purpose. If a move-and-indicate operation is used, the masked-off values located in, for example, register Y may be moved to that same register Y (or any other register that is currently not in use). No matter the operation, the goal is to target memory or a register that is not currently in use by the application and thus, will not change the behavior of the application in any way (but for the possible generation of an exception due to the presence of NAN, infinity, or other values checked by the exception). Thus, in this way, otherwise non-checkable locations may be transformed into checkable locations for purposes of the insertion of an X-and-indicate instruction.

Again, as shown in FIG. 10, if there is at least one checkable location, or a location that can be transformed into a checkable location, a selection of a best location for insertion of an X-and-indicate instruction is performed. The selection of the best location for insertion depends upon the particular level of exception coverage desired. That is, in a first level of exception coverage, low overhead with no spurious exceptions is achieved but only partial exception coverage is achieved, i.e. only partial detection of underflow and overflow conditions is provided but full coverage of NAN conditions is provided. In a second level of exception coverage, higher overhead with no spurious exceptions is also achieved with full exception coverage. In still a third level of exception coverage, either of the first two levels of exception coverage are achieved with possibly spurious exceptions rectified in software. The selection of a best location of insertion of an X-and-indicate instruction according to each of these three levels of exception coverage will be described in greater detail hereafter with reference to FIGS. 12A-12C and 13A-13C.

Figure 12A:
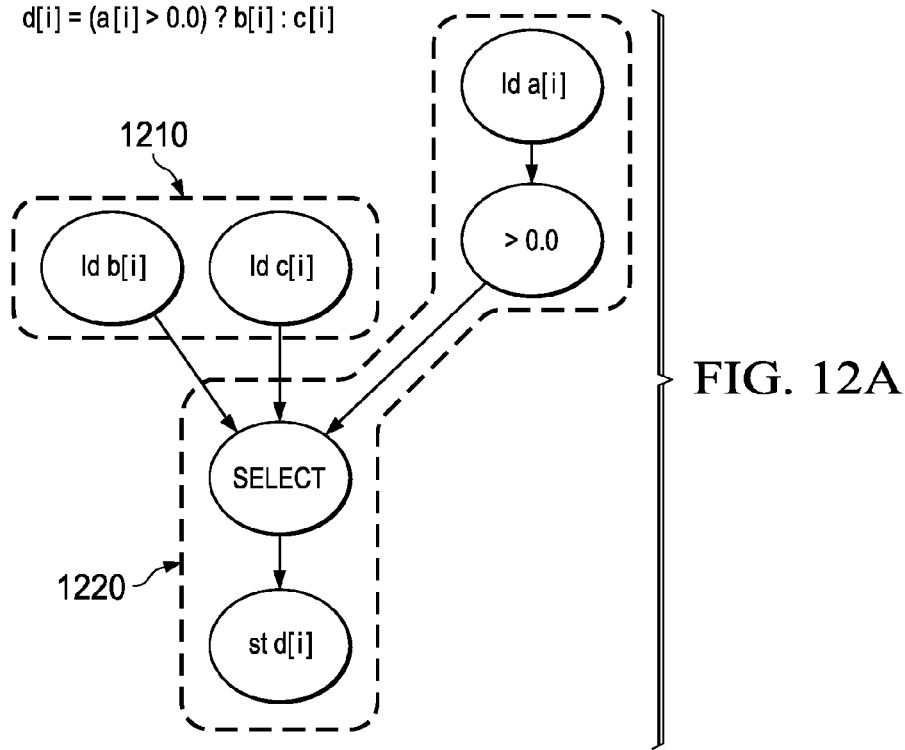
FIGS. 12A-12C are example diagrams illustrating insertion locations for inserting indicate instructions in accordance with one illustrative embodiment.
Figure 12B:
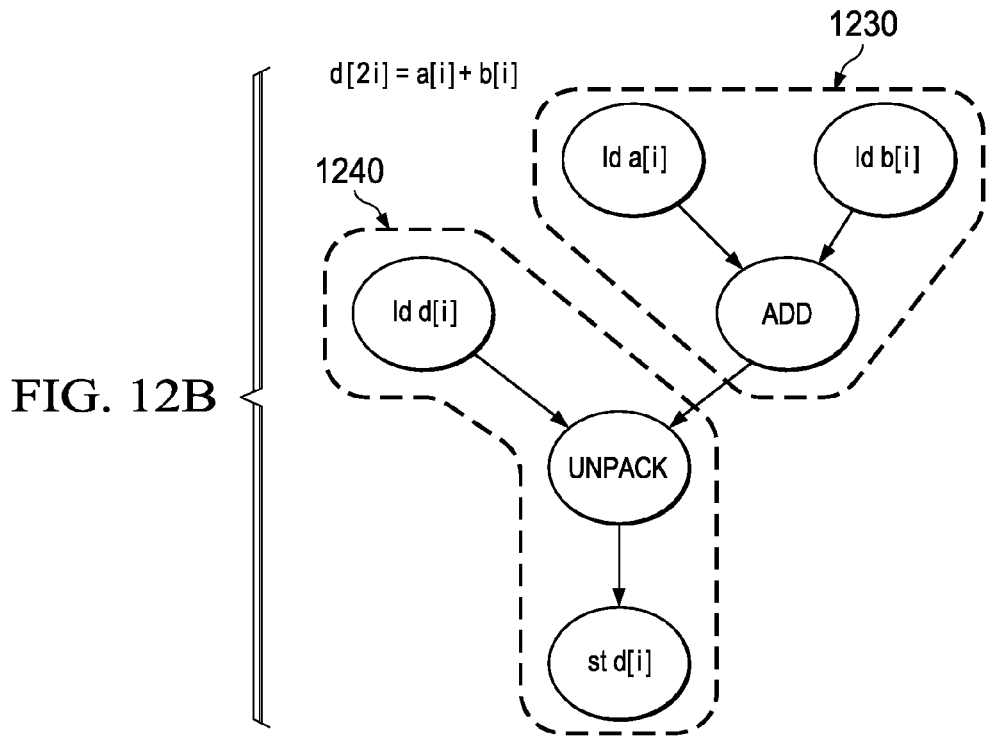
Figure 12C:
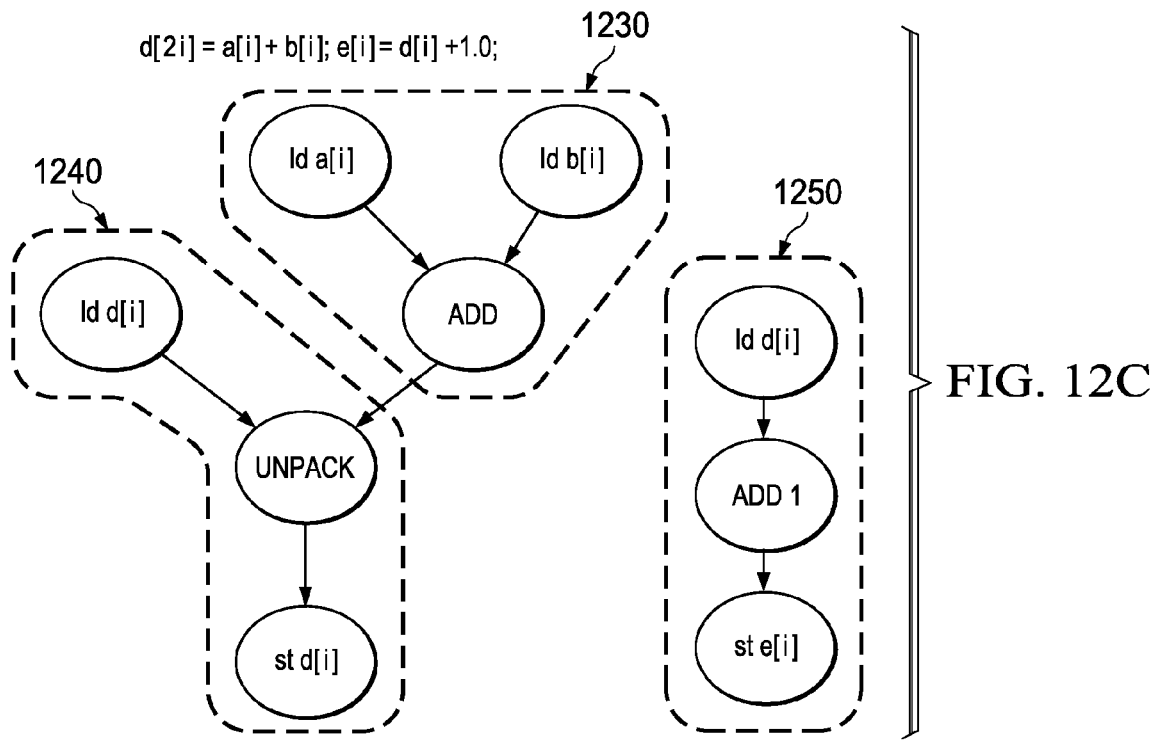

FIGS. 12A-12C are example diagrams illustrating insertion locations for inserting indicate instructions in accordance with one illustrative embodiment. In this illustrative embodiment, a first level of exception coverage is utilized, i.e. one in which there is only partial exception coverage. With this illustrative embodiment, a minimum number of X-and-indicate instructions is inserted so as to test each live output value. As part of this illustrative embodiment, selecting the best location(s) for insertion of the X-and-indicate instruction involves, after detecting each checkable vector register in a computation, detecting the minimum number of locations that test each live output register value that is computed by the computation and inserting a corresponding X-and-indicate instruction, e.g., a store-and-indicate, move-and-indicate, add-and-indicate, or other X-and-indicate instruction corresponding to the instruction at the location identified.

The selection of the minimum number of locations to test each live output register value may involve, for example, selecting one or more checkable locations so that no further computations may reach a store instruction without being checked by an X-and-indicate instruction. It is desirable to catch such values as early as possible in the execution of the unit of work, or at a point where there is a smallest amount of additional overhead costs. This may be further relaxed when there are multiple statements in a unit of work, e.g., when the compiler is operating on a basic block or the like. For example, assume that the compiler is working on a basic block comprising an instruction that sets a value for a vector a[i], e.g., a[i]= . . . , and an instruction that utilizes the vector value a[i], e.g., . . . = . . . a[i] . . . . In such a case, the compiler only needs to insert an X-and-indicate instruction in a location corresponding to the second instruction since a[i] in the first instruction storing a special value indicative of an exception implies that a[i] in the second instruction also results in the special value indicative of the exception, e.g., a NAN value in the first instruction causes a NAN value in the second instruction.

Referring again to FIGS. 12A-12C, FIG. 12A illustrates a first example for insertion of an X-and-indicate instruction in accordance with this first level of exception coverage. This first example is with regard to the statement d[i]=(a[i]>0.0) ? b[i]: c[i]. As shown in FIG. 12A, the portion 1210 is not checkable and the portion 1220 is checkable under the previously described criteria. The earliest insertion location in the dependence graph where all of the live output values may be checked by an inserted X-and-indicate instruction is at the store instruction st d[i]. That is, the first node in the dependence graph where all of the live values in the unit of work, in this case the statement, is after the select operation where live values that are to be used in modifying the storage image are selected. Thus, in this case, a store-and-indicate instruction may be inserted into the store node location to replace the original store instruction. Note that in this example, one must also check the value of "a[i]" for possible NAN numbers. The reason for this check is that compare operations (such as greater than or ">" here) are defined as returning a false value if any of its inputs are NAN. Thus, if one were not to check for exceptions in the "a[i]" values, then if there were a NAN value in a given slot of the vector register, it would always select the "c[i]" value for that slot. Since the "c[i]" value may not be a NAN, checking for the "c[i]" value as the store and indicate is being performed would not reveal the NAN that was present in the "a[i]" value. For this example, thus, one must check the "a[i]" value for the NAN.

FIG. 12B illustrates a second example of insertion of an X-and-indicate instruction for the example statement d[2i]=a[i]+b[i]. The portion 1230 of the dependence graph for the statement is checkable and the portion 1240 is not checkable, under the definition of these conditions specified above. In this example, the first location in the dependence graph where all live values may be checked is at the add instruction. As a result, an add-and-indicate instruction may be inserted into this node in replacement of the original add instruction. In a platform lacking an add-and-indicate instruction, one can use an additional move-and-indicate where the register holding the result of the add is moved to another unused register (which will not be later used) only for the purpose of using an indicate operation on the result of the add operation. Similarly, one could also use a store-and-indicate to store the result of the addition into an unused memory location, also only for the purpose of using an indicate operation on the result of the add operation.

FIG. 12C illustrates a third example of insertion of an X-and-indicate instruction for the example basic block comprised of statements d[2i]=a[i]+b[i]; and e[i]=d[i]+1.0. As shown in FIG. 13C, the dependence graph for the first statement in the basic block is the same as that shown in FIG. 13B and thus, it has the same checkable portion 1230 and non-checkable portion 1240. The dependence graph for the second statement is completely checkable. However, rather than having to insert the X-and-indicate instruction in the add node of the dependence graph of the first statement, since the second statement utilizes the result of the first statement and thus, any special values indicative of an exceptional condition generated by the first statement will be passed on to the second statement, it is sufficient to check for these special values in the execution of the second statement by insertion of an X-and-indicate instruction in the dependence graph of the second statement. In the depicted example, the optimum place to insert the X-and-indicate instruction so as to capture all live values of the basic block is at the store instruction st e[i] in the dependence graph of the second statement.

Thus, under the first level of exception coverage, a minimum number of X-and-indicate instructions are inserted into the code. This makes the code more efficient in terms of the execution time of the code, but allows for some exception conditions to be only partially detected. To illustrate this further, consider the table below:

| Rule | Operation | Result |
|---|---|---|
| 1 | N/0 | infinity |
| 2 | −N/0 | −infinity |
| 3 | infinity + N | infinity |
| 4 | infinity + infinity | infinity |
| 5 | −infinity − infinity | −infinity |
| 6 | infinity * N | infinity |
| 7 | −infinity * N | −infinity |
| 8 | infinity/N | infinity |
| 9 | −infinity/N | −infinity |
| 10 | 0/0 | NAN |
| 11 | infinity/infinity | NAN |
| 12 | −infinity/infinity | NAN |
| 13 | infinity − infinity | NAN |
| 14 | infinity * 0 | NAN |

It can be seen from this table that, for most operations, inputs that are positive or negative infinity may result in the output of an operation being either positive or negative infinity, or Not-a-Number (NAN). Consider, for example, the addition operation, e.g. "c[i]=(a[i]−1)+(b[i]−1)". According to rule 3 above, adding a finite positive number N to infinity yields infinity; similarly, according to rule 4 above, adding infinity to infinity also yields infinity. However, according to rule 13 above, adding minus infinity to positive infinity result in NAN. Thus, if the user expects the proper exceptions to be reported, namely if the user expects the program to report an infinity exception when an infinity number is encountered, and a NAN exception when a NAN number is encountered, it is not sufficient to check the value being stored ("c[i]" in the above example) as the store and indicate operation may report a NAN, when in fact "(a[i]−1)" may have been positive infinity and "(b[i]−1)" may have been negative infinity. So, to truthfully report exceptions in such a case, one must check the input to the addition operation (to make sure there is no NAN and/or positive/negative infinity), in addition to the output of the operation (since adding to very large finite number may result in generating an positive infinite number representation). Contrast this to checking for NAN only. Since an addition with either input being NAN results in a NAN number, it is sufficient to check for exceptions after the addition, as the values are being stored into "c[i]" in the above example.

As mentioned above, a second level of exception coverage is also possible in which there is full exception coverage, i.e. all underflow and overflow exception conditions are detected by the mechanisms of the illustrative embodiments. With this second level of exception coverage, checking for special values indicative of an exception condition is performed after each computation that may generate an underflow, overflow, or NAN condition. For example, arithmetic operations may generate these special exception conditions and values but other operations, such as select, align, compare, and logical operations do not generate such special exceptions and values.

Figure 13A:
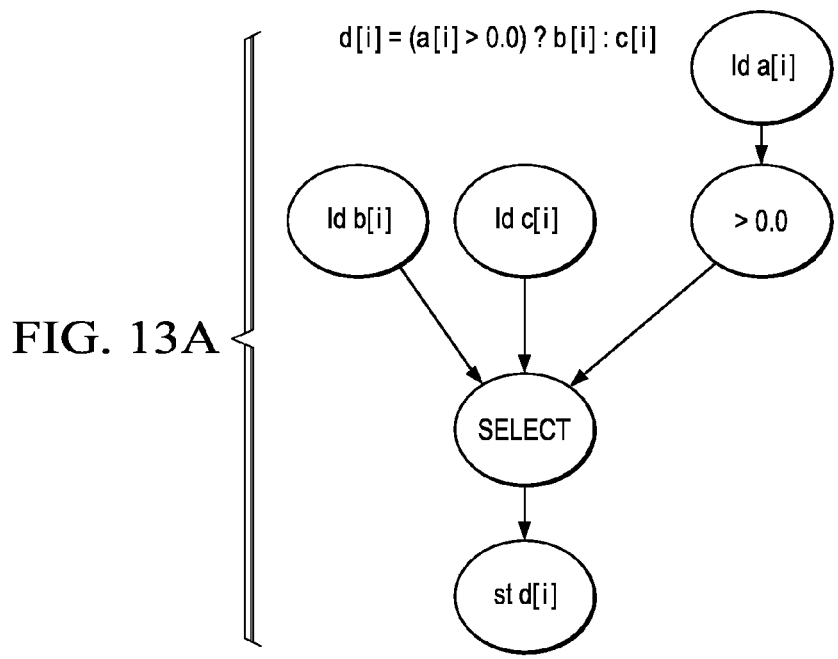
FIGS. 13A-13C are example diagrams illustrating insertion locations for inserting indicate instructions in accordance with another illustrative embodiment.
Figure 13B:
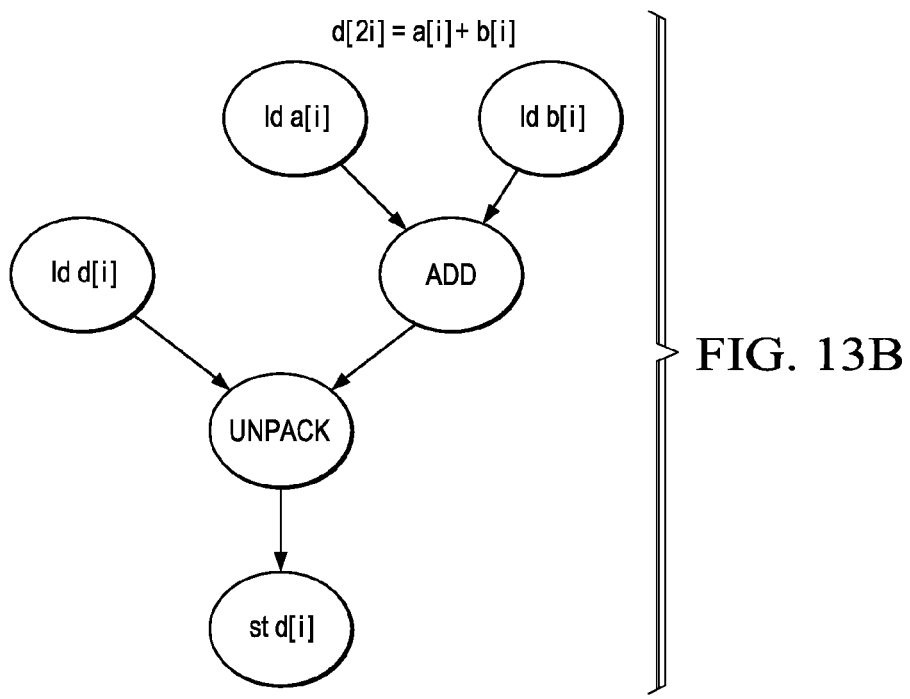
Figure 13C:
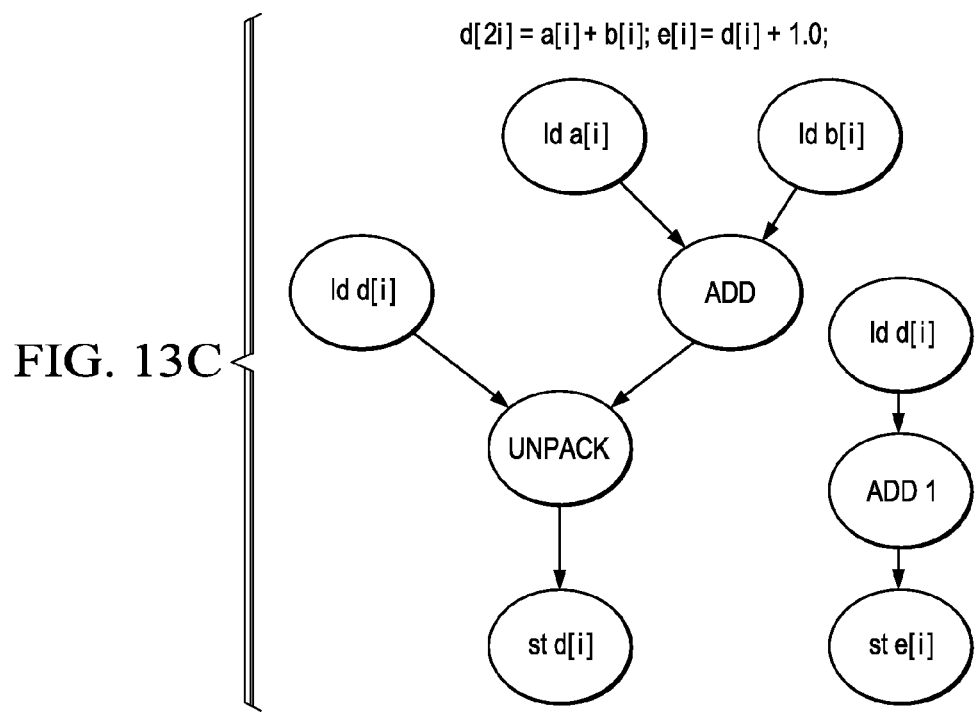

FIGS. 13A-13C are example diagrams illustrating insertion locations for inserting indicate instructions in accordance with this other illustrative embodiment in which a second level of exception coverage is desirable. The examples shown in FIGS. 13A-13C are for the same statements and basic block as shown in FIGS. 12A-12C and thus, the dependence graphs are the same. Moreover, FIGS. 13A and 13B result in similar insertion points for the insertion of X-and-indicate instructions because, in FIG. 13A, the statement does not involve a calculation and in the example of FIG. 13B, the "add" calculation point where the insertion is performed under this second level of exception coverage is the same point at which the insertion is performed for the first level of exception coverage under its criteria. The difference comes in the example shown in FIG. 13C where there are two insertion points instead of the one insertion point shown in FIG. 12C. Since there is a calculation in the first dependence graph, an additional insertion point for adding a X-and-indicate instruction is identified at the "add" instruction node in the first dependence graph, with the second insertion point being the store st e[i] similar to that of the first level of exception coverage embodiment.

As mentioned above, in situations where there are no locations in a dependence graph of a unit of work, e.g., statement, basic block, etc., that are checkable, some transformations may be performed for transforming a non-checkable location into a checkable location. One transformation, as mentioned above, is to use a mask to mask off uncheckable values in a vector register and then check the other values. Another transformation may involve disabling SIMD vectorization of uncheckable values and splitting a loop into several loops to aggregate checkable and uncheckable statements together. For example, a loop peeling operation may be used to peel iterations of a loop that involve uncheckable values from iterations of a loop that involve checkable values. Such a situation may arise when there is a read-modify-write at the beginning and/or end of a loop, such as depicted in FIG. 11C above.

In a third level of exception coverage, either of the first two levels of exception coverage may be utilized and augmented with an empirical determination as to whether an uncheckable value is known to rarely except or not. That is, one can speculatively check the uncheckable value and use a custom invalid value exception handler that detects if an actual exception occurred or if the exception is a spurious exception due to checking a value that should not have been checked in the first place. If the later is the case, then the vector output register may be treated as checkable by the invalid value exception handler. Otherwise, if the uncheckable values result in actual exceptions, then the uncheckable portions of the vector output register are treated as scalar and SIMD execution of the instructions on this vector output register are converted from SIMD back to scalar execution.

The invalid value exception handler may detect where such exceptions occur, compute masks to determine which exceptions in a register can be ignored as spurious and which cannot. The invalid value exception handler may then return back to the application if the exception was spurious or report the exception if the exception was not spurious. Consider the same example considered above, namely "c[i]=(a[i]−1)+(b[i]−1)". As discussed above, in order to provide a second level of exception coverage where all positive and negative infinity were reported, two move-and-indicate operations were inserted to check that there is not a case where "a[i]−1" may be positive infinity and "b[i]−1" may be negative infinity (or vice versa). Recall that it was necessary to test for this case since adding plus infinity to minus infinity results in a NAN, which results in a different exception than the positive or negative infinity. Now, further assume that the case where one of the inputs to the add is positive infinity and the other input to the add is negative infinity is very rare indeed. In such a case, it can be determined to not add such checks after the "a[i]−1" and "b[i]−1" operations, and only check the results with a store-and-indicate. Now, assuming that a NAN exception is encountered, it is not known if an exception is generated due to either/both a[i] or b[i] themselves being NAN or due to the addition of positive infinity to negative infinity. In such case, in this third level of exception coverage, the exception handler replays the calculations and determines after each step whether a positive infinity, negative infinity, or NAN number is computed, or not. Thus, with such a scheme, one may achieve the same level of exception reporting level at much lower cost, assuming that exceptions are very rare to begin with.

It should be noted that the particular level of exception coverage desired may be passed to the compiler as a configuration parameter prior to initiating the compilation of the source code, or at least a portion of source code. For example, a user may specify the level of exception coverage desired by passing a value of a parameter to the compiler which may then select the appropriate logic to apply to the units of work being handled by the compiler based on the parameter. Alternatively, the compiler may dynamically select which level of exception coverage to use based on predicted or empirically determined execution times for the units of work compared to a pre-determined threshold. For example, the compiler may estimate the number of processor cycles required to perform the modified SIMD code as compared to the original scalar code and if the difference is higher than a predetermined threshold, e.g., the percentage difference is greater than an acceptable percentage, then a different level of exception coverage may be utilized that is expected to achieve a more processor cycle efficient result.

Thus, with the mechanisms of the illustrative embodiments, a compiler may, in optimizing and compiling original source code written for scalar execution, transform the original source code into SIMD vectorized code utilizing the various exception deferring mechanisms noted above and the insertion of X-and-indicate instructions where appropriate to check for special values indicative of a deferred exception condition having occurred. The compiler may utilize any one or combination of the various mechanisms noted above to achieve optimum performance of the code. Particularly, the compiler may utilize the logic implementing one or more of the mechanisms outlined above with regard to FIGS. 10-13C to select an insertion point in a unit of work for inserting an X-and-indicate instruction for checking for a special value indicative of a deferred exception. Such selection of an insertion point utilizes the definitions of "live" values and "checkable" and "uncheckable" or "non-checkable" values set forth above.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for inserting instructions into code for checking for in-data path special exception values indicative of deferred exception conditions, comprising:
   analyzing, by a compiler executing on a processor of the data processing system, a portion of first code to identify at least one non-speculative instruction performing a designated non-speculative operation in the first code that is a candidate for replacement by an operation-and-indicate instruction that performs the designated non-speculative operation and further performs an indication operation for indicating any exception conditions corresponding to in-data path special exception values present in vector slots of vector register inputs to the operation-and-indicate instruction;
   replacing, by the compiler executing on the processor, the at least one non-speculative instruction performing a designated non-speculative operation in the first code with the operation-and-indicate instruction; and
   generating, by the compiler executing on the processor, second code based on the replacement of the at least one non-speculative instruction in the first code, wherein analyzing the portion of first code comprises analyzing a dependence graph of the portion of the first code to identify a node within the dependence graph where an operation-and-indicate instruction may be inserted as a replacement for an instruction corresponding to the node.

2. The method of claim 1, wherein the operation-and-indicate instruction is one of a store-and-indicate instruction, which performs a store operation to memory and indicates an exception condition corresponding to an in-data path special exception value if any, a move-and-indicate instruction, which moves a vector input from one vector register to another vector register and indicates an exception condition corresponding to an in-data path special exception value if any, or a computation-and-indicate instruction, which performs a computation operation on input vectors, generates a vector output, and indicates an exception condition corresponding to an in-data path special exception value if any.

3. The method of claim 1, wherein the first code includes single instruction multiple data (SIMD) code.

4. The method of claim 1, wherein analyzing the portion of first code further comprises determining if a vector output register of the instruction corresponding to the node is checkable or uncheckable, wherein:
- a vector output register is checkable if each value stored in each slot of the vector output register is checkable,
- a value is checkable if it is a floating point value that is live and was actually computed or if the value is guaranteed to not cause an exception condition, and
- a value is live if the value impacts a storage image of a memory of the data processing system or a decision process of the first code, or a successive computation that uses the value impacts the storage image or decision process.

5. The method of claim 4, wherein replacing the at least one non-speculative instruction with the operation-and-indicate instruction comprises inserting the operation-and-indicate instruction at a node in the dependence graph of the portion of the first code where live floating point values of the vector output registers of the portion of the first code are checked for the in-data path special exception value.

6. The method of claim 4, wherein replacing the at least one non-speculative instruction with the operation-and-indicate instruction comprises inserting the operation-and-indicate instruction at each node in the dependence graph of the portion of the first code where a computation is performed.

7. The method of claim 4, wherein analyzing the portion of first code further comprises:
- determining if there is at least one node in the dependence graph that is associated with an instruction whose output vector register is checkable;
- in response to determining that there is not at least one node in the dependence graph that is associated with an instruction whose output vector register is checkable, determining if at least one node in the dependence graph is a transformable node that is associated with an instruction whose output vector register is transformable into a checkable output vector register; and
- transforming the instruction associated with the at least one transformable node such that the output vector register of the instruction associated with the at least one transformable node is checkable.

8. The method of claim 7, wherein transforming the instruction associated with the at least one transformable node comprises masking non-checkable values in the output vector register.

9. The method of claim 7, wherein transforming the instruction associated with the at least one transformable node comprises performing loop peeling such that the output vector register stores only checkable values.

10. The method of claim 7, further comprising:
- determining if a cost associated with the transforming of the instruction associated with the at least one transformable node is above a threshold; and
- in response to the cost being above the threshold, not performing the transforming of the instruction associated with the at least one transformable node.

11. The method of claim 10, wherein if the cost is above the threshold, vectorization of the second code is reverted at least in part.

12. The method of claim 1, wherein the data processing system is configured to store the in-data path special exception values in vector output registers, in response to a speculative instruction generating an exception condition, without initiating exception handling.

13. The method of claim 1, wherein replacing the at least one non-speculative instruction with the operation-and-indicate instruction comprises inserting the operation-and-indicate instruction at a node in the dependence graph of the portion of the first code where a comparison operation is performed.

14. The method of claim 1, wherein the in-data path special exception values are at least one of a Not-a-Number (NaN) value, a positive infinity value, or a negative infinity value.

15. The method of claim 14, wherein the in-data path special exception values that are identified by the operation-and-indicate instruction are controlled by a configuration setting of a computing device upon which the second code is executed, wherein the configuration setting specifies one or more of the NaN value, positive infinity value, or negative infinity value as being enabled for identification by the operation-and-indicate instruction.

16. The method of claim 1, wherein generating the second code comprises generating speculative instructions in the second code that defer exceptions by inserting an in-data path special exception value into a vector element of a corresponding vector register that is later checked by the operation-and-indicate instruction.

17. The method of claim 4, further comprising:
- providing an interrupt handler that detects whether an interrupt is due to a checkable value or a non-checkable value in a vector output register, wherein the interrupt handler performs operations to handle the interrupt in response to the interrupt being due to a checkable value, and wherein the interrupt handler ignores the interrupt in response to the interrupt being due to a non-checkable value.

18. A computer program product comprising a computer readable storage medium having a computer readable program recorded thereon, wherein the computer readable program, when executed on a computing device, causes the computing device to:
- analyze a portion of first code to identify at least one non-speculative instruction performing a designated non-speculative operation in the first code that is a candidate for replacement by an operation-and-indicate instruction that performs the designated non-speculative operation and further performs an indication operation for indicating any exception conditions corresponding to in-data path special exception values present in vector slots of vector register inputs to the operation-and-indicate instruction;
- replace the at least one non-speculative instruction performing a designated non-speculative operation in the code with the operation-and-indicate instruction; and
- generate second code based on the replacement of the at least one non-speculative instruction, wherein the computer readable program causes the computing device to analyze the portion of first code at least by analyzing a dependence graph of the portion of the first code to identify a node within the dependence graph where an operation-and-indicate instruction may be inserted as a replacement for an instruction corresponding to the node.

19. A method, in a data processing system, for inserting instructions into code for checking for special values indicative of deferred exception conditions, comprising:
- analyzing, by a processor of the data processing system, first code to identify at least one non-speculative instruction performing a designated non-speculative operation in the first code that is a candidate for replacement by an operation-and-indicate instruction that performs the designated non-speculative operation and further performs an indication operation for indicating any exception conditions corresponding to in-data path special exception values present in vector slots of vector register inputs to the operation-and-indicate instruction;

replacing, by the processor, the at least one non-speculative instruction performing a designated non-speculative operation in the code with the operation-and-indicate instruction;

generating, by the processor, second code based on the replacement of the at least one non-speculative instruction;

executing the second code in the processor or another processor of the data processing system, or in another computing device;

tracking exception conditions during execution of speculative instructions in the second code using special values indicative of the exception conditions, without invoking an exception handler; and executing the operation-and-indicate instruction in the second code to detect the special values and perform the operation and indication operation, wherein the indication operation causes the exception handler to be invoked, wherein analyzing the portion of first code comprises analyzing a dependence graph of the portion of the first code to identify a node within the dependence graph where an operation-and-indicate instruction may be inserted as a replacement for an instruction corresponding to the node.

* * * * *